(12) United States Patent
Vander Broek

(10) Patent No.: US 11,670,021 B1
(45) Date of Patent: Jun. 6, 2023

(54) ENHANCED GRAPHICAL USER INTERFACE FOR REPRESENTING EVENTS

(71) Applicant: SPLUNK Inc., San Francisco, CA (US)

(72) Inventor: Philip John Vander Broek, San Francisco, CA (US)

(73) Assignee: SPLUNK Inc., San Francisco, CA (US)

(*) Notice: Subject to any disclaimer, the term of this patent is extended or adjusted under 35 U.S.C. 154(b) by 0 days.

(21) Appl. No.: 17/501,248

(22) Filed: Oct. 14, 2021

Related U.S. Application Data

(63) Continuation of application No. 15/224,651, filed on Jul. 31, 2016, now abandoned, which is a continuation of application No. 14/165,232, filed on Jan. 27, 2014, now Pat. No. 9,437,022.

(51) Int. Cl.

| | | |
|---|---|---|
| *G06T 11/20* | (2006.01) | |
| *G06F 3/04847* | (2022.01) | |
| *G06F 16/2458* | (2019.01) | |
| *G06Q 30/0201* | (2023.01) | |
| *G06Q 30/02* | (2023.01) | |
| *G06Q 10/06* | (2023.01) | |
| *G06F 3/0486* | (2013.01) | |
| *G06T 11/00* | (2006.01) | |

(52) U.S. Cl.
CPC .......... *G06T 11/206* (2013.01); *G06F 3/0486* (2013.01); *G06F 3/04847* (2013.01); *G06F 16/2477* (2019.01); *G06Q 10/06* (2013.01); *G06Q 30/02* (2013.01); *G06Q 30/0201* (2013.01); *G06T 11/001* (2013.01)

(58) Field of Classification Search
CPC .............. G06T 11/206; G06F 3/04847; G06F 16/2477; G06Q 10/06; G06Q 30/02; G06Q 30/0201
See application file for complete search history.

(56) References Cited

U.S. PATENT DOCUMENTS

| | | |
|---|---|---|
| 5,717,911 A | 2/1998 | Madrid et al. |
| 6,057,839 A | 5/2000 | Advani et al. |
| | (Continued) | |

OTHER PUBLICATIONS

Walkenbach, John, "Microsoft Excel 2010 Bible" (2010).*
(Continued)

*Primary Examiner* — Sarah Lhymn
(74) *Attorney, Agent, or Firm* — Shook, Hardy & Bacon L.L.P.

(57) ABSTRACT

Systems and methods are provided for an enhanced graphical user interface (GUI) for presenting events. In particular, a graphical user interface includes, a visualization of unique values. Such a visualization includes a first set of rows for each unique value, wherein each row is divided into regions each representing a timeslot within the time range. Each region in a particular row of the first set of rows graphically illustrates a count of events from the plurality of events that both have an associated timestamp that is within a respective timeslot represented by the region and include a particular unique value associated with the particular row. The graphical user interface also includes a table including a second set of rows that each correspond to the first set of rows. Each row includes a set of statistics determined from events that each include the particular unique value associated with the row.

18 Claims, 20 Drawing Sheets

(56) References Cited

U.S. PATENT DOCUMENTS

| | | | | |
|---|---|---|---|---|
| 6,920,608 | B1* | 7/2005 | Davis | G06F 40/143 |
| | | | | 715/209 |
| 7,249,328 | B1* | 7/2007 | Davis | G06F 40/106 |
| | | | | 715/210 |
| 7,752,251 | B1* | 7/2010 | Shuster | G06F 16/954 |
| | | | | 709/200 |
| 8,943,154 | B1* | 1/2015 | Bodell | H04L 41/0604 |
| | | | | 709/224 |
| 2002/0078131 | A1 | 6/2002 | Dowd et al. | |
| 2008/0091757 | A1 | 4/2008 | Ingrassia et al. | |
| 2008/0320124 | A1* | 12/2008 | Lee | G06F 16/958 |
| | | | | 709/224 |
| 2011/0227927 | A1 | 9/2011 | Garmon et al. | |
| 2011/0261049 | A1 | 10/2011 | Cardno et al. | |
| 2011/0289475 | A1 | 11/2011 | Sukhenko et al. | |
| 2012/0023261 | A1 | 1/2012 | Lindsay et al. | |
| 2012/0089920 | A1* | 4/2012 | Eick | G06T 11/206 |
| | | | | 715/739 |
| 2012/0166250 | A1 | 6/2012 | Ferrante et al. | |
| 2012/0235921 | A1* | 9/2012 | Laubach | G06F 3/04892 |
| | | | | 345/172 |
| 2012/0236201 | A1 | 9/2012 | Larsen | H04N 21/242 |
| | | | | 348/468 |
| 2012/0262472 | A1 | 10/2012 | Garr et al. | |
| 2013/0103677 | A1 | 4/2013 | Chakra et al. | |
| 2013/0132348 | A1* | 5/2013 | Garrod | G06F 16/2372 |
| | | | | 707/648 |
| 2013/0198669 | A1 | 8/2013 | Gao et al. | |
| 2014/0132623 | A1* | 5/2014 | Holten | G06T 11/001 |
| | | | | 345/593 |
| 2014/0297642 | A1* | 10/2014 | Lum | G16H 40/63 |
| | | | | 707/737 |
| 2014/0340407 | A1 | 11/2014 | Perez et al. | |
| 2014/0372414 | A1* | 12/2014 | Malinowski | G06F 16/248 |
| | | | | 707/722 |
| 2015/0006518 | A1 | 1/2015 | Baumgartner et al. | |
| 2015/0088851 | A1* | 3/2015 | Deshpande | G06F 16/9535 |
| | | | | 707/708 |
| 2015/0127650 | A1* | 5/2015 | Carlsson | G06F 16/3334 |
| | | | | 707/737 |

OTHER PUBLICATIONS

Bumgarner, V. (2013). Implementing Splunk-Big Data Reporting and Development for Operational Intelligence. Packt Publishing Ltd.*

Carraso, D., "Exploring Splunk," published by CITO Research, New York, USA, pp. i-iii and 3-154 (Apr. 2012).

Cukier, J.,"d3: scales, and color", available at: http://www.jeromecukier.net/blog/2011/08/11/d3-scales-and-color/, pp. 1-15 (2011).

Pleil, J. D., et al. "Heat map visualization of complex environmental and biomarker measurements", Chemosphere, vol. 84, Issue 5, pp. 716-723 (2011).

* cited by examiner

ENHANCED GRAPHICAL USER INTERFACE FOR REPRESENTING EVENTS

CROSS-REFERENCE TO RELATED APPLICATION

This application is a Continuation of U.S. patent application Ser. No. 15/224,651, filed Jul. 31, 2016, which is itself a Continuation of U.S. patent application Ser. No. 14/165,232, filed Jan. 27, 2014 and issued as U.S. Pat. No. 9,437,022, the entire contents of both applications are incorporated by reference herein.

TECHNICAL FIELD

The present disclosure relates generally to techniques for processing and visualizing data field values over a period of time.

BACKGROUND

Enterprise organizations and the data analysts they employ face the challenge of finding useful information in the increasing amounts of data generated and collected by these organizations over time. Such "big data" may provide, for example, valuable insights into the organization's operational performance and business patterns associated with various parts of the organization. For example, accessing computer networks of a business enterprise and transmitting electronic communications across these networks generates massive amounts of data. Such data generated by machines may include, for example, Web logs of activity occurring at various web servers distributed across an enterprise's network.

Analysis of this data can indicate patterns in consumer behavior with respect to the particular products or brands in which consumers may be interested during a given period of time. Such pattern analysis also may be helpful in differentiating normal operational performance from anomalies. For example, the detection of unusual patterns can allow a system analyst to investigate the circumstances under which these unusual patterns emerged and determine whether any issues exist that may pose a threat to the system's operational performance or security. Moreover, analysis of such data allows business enterprises to understand how their employees, potential consumers, and/or Web visitors use the company's online resources. Such analysis can therefore provide businesses with operational intelligence, business intelligence, and an ability to better manage their information technology (IT) resources. For instance, such analysis may enable a business to better retain customers, meet customer needs, and improve the efficiency and security of the company's IT resources.

However, data analysts or systems administrators of an enterprise may encounter significant challenges when attempting to identify, collect, and analyze such large quantities of data, which may be distributed across multiple data sources within the enterprise's network environment or IT infrastructure. Such challenges may prevent these enterprise users from realizing the potential value that this data may provide. In particular, patterns in the enterprise's data as a whole, which may provide valuable insight into the operations of the enterprise, may be difficult to find due in part to the size of this data and the fact that the underlying data produced by each data source within the enterprise is usually analyzed in isolation, if at all.

SUMMARY OF A FEW EMBODIMENTS

Embodiments of the present disclosure relate to, among other things, visualizing values over time in a field defined for a set of events, which may be derived from machine data, log data, and/or other data. Each of the embodiments disclosed herein may include one or more of the features described in connection with any of the other disclosed embodiments.

In one embodiment, a method is disclosed for visualizing, over time, values of a field in events that may be derived wholly or partially from machine data. An input may be received from a user via a graphical user interface. The input specifies a field and a time range. A set of events may be identified based on the input received from the user. Each event in the identified set may occur during the time range and may include a value for the specified field. A set of unique values for the field may be determined from the identified set of events. For each unique value in the set of unique values, a subset of events including that unique value for the field may be identified. Each event in the identified subset may include a time-stamp coinciding with one of a plurality of time slots within the time range. A visualization of counts of events from each of the subset of events identified for each unique value of the field within the time range may be provided. The visualization may display a set of rows intersecting with a set of columns, where each row corresponds to one unique value in the set of unique values, each column corresponds to one of the plurality of time slots, and each intersection of a row and a column provides an indication of a number of events including the unique value corresponding to the row and having a time-stamp coinciding with the time slot corresponding to the column.

Various embodiments of the method may include one or more of the following features: the events may be derived at least in part from machine data; the events are derived at least in part from log files generated by one or more servers; the indication of the number of events may be an absolute or relative indication of the number of events that is provided using a color or shade; the color or shade may be applied to each intersection according to a linear scale; the color or shade may be applied to each intersection according to a logarithmic scale; the color or shade may be applied to each intersection according to an exponential scale; the color or shade may be applied to each intersection according to a rank assigned to that intersection based on the corresponding number of events; the color or shade may be applied to each intersection across each individual row, each individual column, a subset of rows and columns selected by the user, or all displayed rows and columns of the visualization; the method may further include steps of receiving input from the user specifying a time granularity via the graphical user interface, the graphical user interface including a control element for enabling the user to vary the time granularity, and adjusting a duration of time covered by each of the plurality of time slots based on the received time granularity; the method may further include steps of receiving user input selecting a header portion of a column in the set of columns of the visualization and sorting the set of rows in ascending or descending order according to the number of events including the value corresponding to each row in the set of rows, based on the received user input; the visualization may include a statistics table displaying a set of statistics calculated for each unique value in the set of unique values for the field, and the set of statistics is calculated based on the identified subset of events for each unique value; the visualization provided to the user may be a heat map indicating variations in an event count representing the one or more events coinciding with each of the plurality of time slots over the selected time range for each of the unique values of the specified field; and the graphical user interface may enable the user to reorder each of the set of rows by using a drag and drop gesture with a user input device.

In another embodiment, a system may include a memory having processor-readable instructions stored therein and a processor configured to access the memory and execute the processor-readable instructions, which, when executed by the processor, configures the processor to perform a plurality of functions, including functions to: receive an input from a user via a graphical user interface, where the input may specify a field and a time range; identify events within the machine data based on the input received from the user, where each event in the identified set occurring within the time range and including a value for the specified field; determine a set of unique values for the field from the identified set of events; for each unique value in the set of unique values, identify a subset of events including that unique value for the field, each event in the identified subset having a time-stamp coinciding with one of a plurality of time slots within the time range; and provide a visualization of events from each of the subset of events identified for each unique value of the field within the time range, where the visualization displays a set of rows intersecting with a set of columns, each row corresponds to one unique value in the set of unique values, each column corresponds to one of the plurality of time slots, and each intersection of a row and a column provides an indication of a number of events including the unique value corresponding to the row and having time-stamps coinciding with the time slot corresponding to the column.

Various embodiments of the system may include one or more of the following features: the events may be derived at least in part from machine data; the events may be derived at least in part from log files generated by one or more servers; the indication of the number of events may be an absolute or relative indication of the number of events that is provided using a color or shade; the color or shade may be applied to each intersection according to a linear scale; the color or shade may be applied to each intersection according to a logarithmic scale; the color or shade may be applied to each intersection according to an exponential scale; the color or shade is applied to each intersection according to a rank assigned to that intersection based on the corresponding number of events; the color or shade may be applied to each intersection across each individual row, each individual column, a subset of rows and columns selected by the user, or all displayed rows and columns of the visualization; the processor may be further configured to receive input from the user specifying a time granularity via the graphical user interface, the graphical user interface including a control element for enabling the user to vary the time granularity, and adjust a duration of time covered by each of the plurality of time slots based on the received time granularity; the processor may be further configured to receive user input selecting a header portion of a column in the set of columns of the visualization, and sort the set of rows in ascending or descending order according to the number of events including the value corresponding to each row in the set of rows, based on the received user input; the visualization may include a statistics table displaying a set of statistics calculated for each unique value in the set of unique values for the field, and the set of statistics is calculated based on the identified subset of events for each unique value; the visualization provided to the user may be a heat map indicating variations in an event count representing the one or more events coinciding with each of the plurality of time slots over the selected time range for each of the unique values of the specified field; and the graphical user interface may enable the user to reorder each of the set of rows by using a drag and drop gesture with a user input device.

In a further embodiment, a computer readable medium includes stored instructions that, when executed by a computer, cause the computer to perform functions to: receive an input from a user via a graphical user interface, where the input may specify a field and a time range; identify events within the machine data based on the input received from the user, where each event in the identified set occurring within the time range and including a value for the specified field; determine a set of unique values for the field from the identified set of events; for each unique value in the set of unique values, identify a subset of events including that unique value for the field, each event in the identified subset having a time-stamp coinciding with one of a plurality of time slots within the time range; and provide a visualization of events from each of the subset of events identified for each unique value of the field within the time range, where the visualization displays a set of rows intersecting with a set of columns, each row corresponds to one unique value in the set of unique values, each column corresponds to one of the plurality of time slots, and each intersection of a row and a column provides an indication of a number of events including the unique value corresponding to the row and having time-stamps coinciding with the time slot corresponding to the column.

In yet a further embodiment, a computer readable medium includes stored instructions that, when executed by a computer, cause the computer to perform functions to: display a graphical user interface enabling a user to specify a field and a time range; receive through the graphical user interface a selection of the field and the time range; identify a set of events for which the field has been defined and that are stored in a time series data store, and that have associated time-stamps falling within the time range; determine a set of unique values for the field in the events; for each unique value in the set of unique values, determine a number of events having that unique value for the field and having a time-stamp falling within each of a set of time slots within the time range; display a set of rows, each corresponding to one of the unique values, wherein each row contains a set of columns, each column corresponding to one of the time slots; and for a set of heat map boxes at intersections between a row and a column, provide an absolute or relative indication of the number of events having a value corresponding to the row and a time-stamp falling within the time slot corresponding to the column.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

FIG. 12 illustrates an exemplary computer system in which embodiments of the present disclosure may be implemented. The present invention is described in detail below with reference to the attached drawing figures, wherein:

DETAILED DESCRIPTION

Overview

Figure 1:
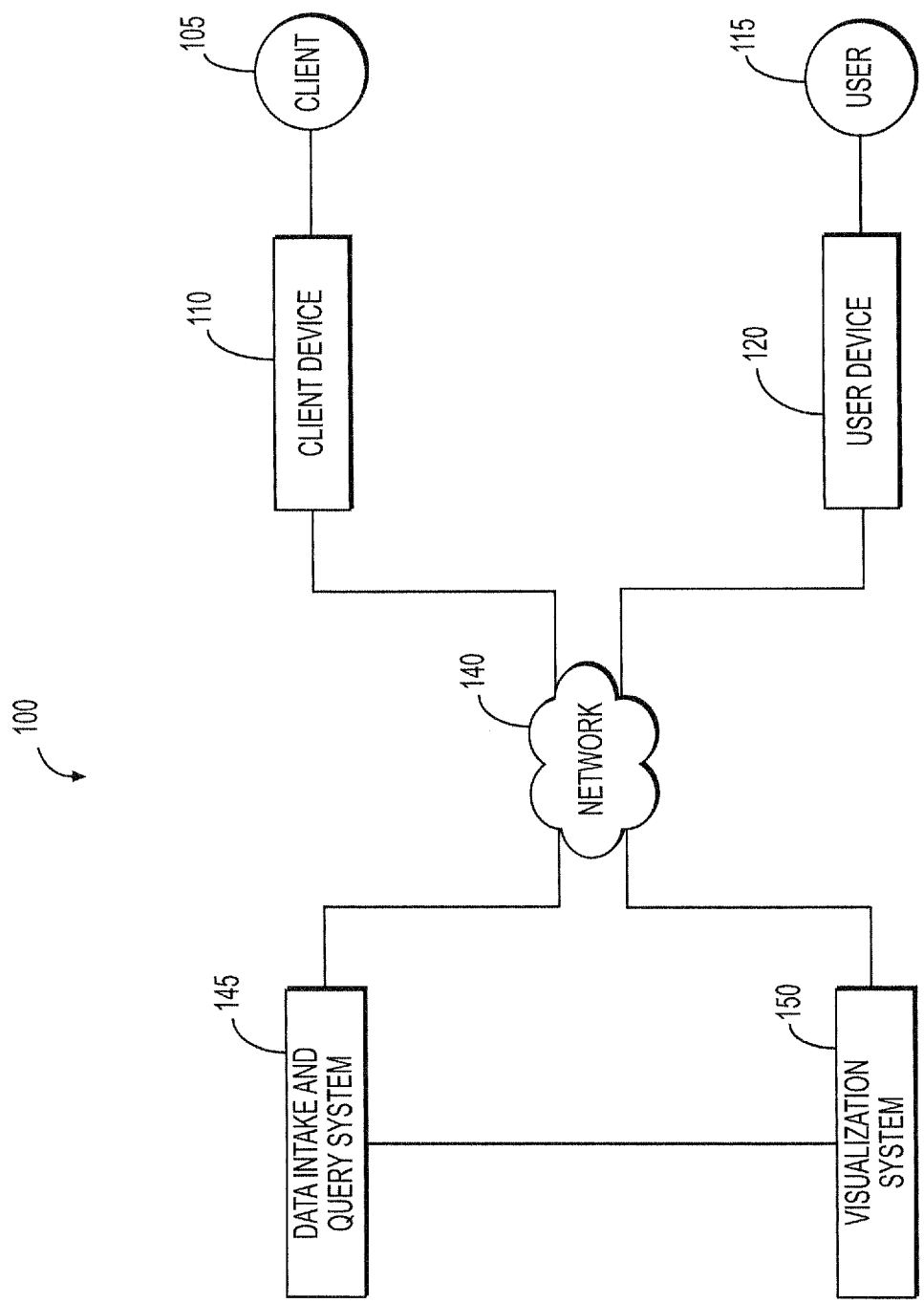
FIG. 1 shows a high-level block diagram of an exemplary enterprise network environment.

The present disclosure relates to systems and methods for visualizing values over time of a field identified in events that may be derived from data including, e.g., machine data. In an example, data generated by various data sources is collected and segmented into discrete events, each event corresponding to data from a particular point in time. Examples of such data sources include, but are not limited to, web servers, application servers, databases, firewalls, routers, operating systems, software applications executable at one or more computing devices within the enterprise data system, mobile devices, and sensors. The types of data generated by such data sources may be in various forms including, for example and without limitation, server log files, activity log files, configuration files, messages, network packet data, performance measurements or metrics, and sensor measurements. The data sources may be associated with, for example, an enterprise data system distributed across a network environment. The events, which may be derived from indexing or segmenting the machine data or other data generated by these data sources, may be used to provide search and data analysis functionality to a user of the enterprise data system, e.g., a data analyst or systems engineer interested in gaining a better understanding of the performance and/or security of an enterprise organization's information technology (IT) infrastructure. As will be described in further detail below, such functionality may include the visualization of events and values for a specified field that may be extracted from the events occurring during a given time period. In some embodiments, the visualization may be of a count or other statistic for visualizing the occurrence over time of events, by a plurality of unique values for the specified field. For example, the visualization may represent how many times events having each of the unique values for the specified field occurred during each of a plurality of time slots extending over the given time period.

While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

It would also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In an embodiment, "time-series data" and "time-series machine data" may include, among other things, a series or sequence of data points generated by one or more data sources or computing devices. Each data point may be associated with a time-stamp or be associated with a particular point in time that provides the basis for a time-stamp for the data point, and the series of data points may be plotted over a time range or time axis representing at least a portion of the time range. The data can be structured, unstructured, or semi-structured and can come from files, directories, and/or network events. Unstructured data may refer to data that is not organized according to, for example, a predefined schema to facilitate the extraction of values or fields from the data. Machine data generated by, for example, data sources within an enterprise network environment is generally unstructured data. As will be described in further detail below, the visualization of such time-series data may be used to display statistical trends over time. The time-series machine data collected from a data source may be segmented or otherwise transformed into discrete events, where each event can be associated with a time-stamp.

In an embodiment, an "event" may include, among other things, a single piece of data corresponding to a time-stamped record of activity associated with a particular data source. Such an event may correspond to, for example, a record in a log file or other data input. In some instances, a single event may correspond to a single line in a log file or other data input. However, some inputs may have multiline events, for example, XML logs, and some inputs may have multiple events corresponding to a single line or record within the log file. Further, "events" may include, among other things, all of the events that may be derived from processing or indexing machine data, as will be described in further detail below. Events can also correspond to any time-series data, such as performance measurements of an IT component (e.g., a computer cluster, node, host, or virtual machine), or a sensor measurement including, but not limited to, sensor data from an accelerometer, gyroscope, digital compass, barometer, location data from a Global Positioning System (GPS) or other type of sensor or device used for location determination (e.g., Wi-Fi, cell-10, and data from a Radio-Frequency Identification (RFID) reader, Near Field Communication (NFC) reader, or the like. The execution of a query or search for a name or keyword within the various stored events, or for events whose values for various fields meet various criteria, or for events occurring at particular times, may produce one or more events responsive to the particular query.

In an embodiment, a "field" may include, among other things, any searchable name/value pair that may appear within the events derived from data, such as machine data. In an example, a data intake and query system within an enterprise network environment may be configured to automatically extract certain fields from the events upon being segmented, indexed, or stored. A field may be defined by a user at any time to enable the representation of the occurrence of events containing values for that user-defined field. A field also may correspond to metadata about the events, such as a time-stamp, host, source, and source type for an event. Such metadata fields may, in some cases, be referred to as "default fields," based on the fields being derived for all events at the time of segmenting, indexing, and/or storing of the events within one or more data stores, as will be described in further detail below. Values for these and other fields, such as user-defined fields, may be extracted from the events themselves or determined for a particular event from other sources related to the event, e.g., interpolated or extrapolated based on values for the same field included within other events occurring within a series of events including the particular event in question. Also, user-specified fields may be extracted from the events at either index time, storage time, or search time, e.g., upon the execution of a search or query for events matching certain user-specified criteria. In some implementations, tags or aliases may be assigned to any field/value combination, for example, in order to identify fields with different names that contain equivalent pieces of information.

Exemplary Embodiments

FIG. 1 shows a high-level block diagram of an exemplary enterprise network environment 100. As shown in FIG. 1, network environment 100 includes a client 105, a client device 110, a user 115, a user device 120, a data intake and query system 145, and a visualization system 150, each of which may be communicatively coupled to each other via, e.g., a network 140. Although only client device 110, user device 120, data intake and query system 145, and visualization system 150 are shown in FIG. 1, it should be noted that network environment 100 may include any additional devices or component systems as desired for a particular implementation.

In the example shown in FIG. 1, each of client device 110 and user device 120 may be any type of computing device having at least one processor and a memory for storing processor-readable instructions and data. Examples of such computing devices include, but are not limited to, a desktop or personal computer, a laptop computer, a netbook computer, a tablet, and a hand-held electronic device, e.g., a smartphone or other type of mobile computing device. However, client device 110 and/or user device 120 may be implemented using a system that includes multiple devices and/or components.

Similarly, data intake query system 145 and visualization system 150 may be implemented using one or more computing devices. In an example, data intake and query system 145 and visualization system 150 may be implemented using one or more servers. Such a server may include, but is not limited to, a web server, a data server, a proxy server, a network server, or other type of server configured to provide data services or exchange electronic information with other servers and other types of computing devices (e.g., client device 110 and user device 120) via network 140. Such a server may be implemented using any type of general purpose computer that includes, for example and without limitation, at least one processor and a memory for executing and storing processor-readable instructions. The memory may include any type of random access memory (RAM) or read-only memory (ROM) embodied in a physical storage medium, such as magnetic storage including floppy disk, hard disk, or magnetic tape; semiconductor storage such as solid state disk (SSD) or flash memory; optical disc storage; or magneto-optical disc storage. Software may include one or more applications and an operating system. Hardware can include, but is not limited to, a processor, memory, and a display (e.g., for displaying a graphical user interface). Such a server may also be implemented using multiple processors and multiple shared or separate memory devices within, for example, a clustered computing environment or server farm.

In some implementations, data intake and query system 145 and visualization system 150 may be communicatively coupled to each other via a direct or indirect connection within, for example, a private network that may be accessible through a firewall via network 140. Further, data intake and query system 145 and visualization system 150 may be implemented as components of a single, integrated data management system, e.g., at a server (not shown) within enterprise network environment 100. Alternatively, data intake and query system 145 or visualization system 150 may be implemented as separate components of a distributed system including various computing devices communicatively coupled to one another via network 140. Alternatively, the functionality of some or all of the visualization system 150 could be included in software running on the client device 110 or user device 120.

Network 140 may be any type of electronic network or combination of networks used for communicating digital content and data between various computing devices. Network 140 may include, for example, a local area network, a medium area network, or a wide area network, such as the Internet. In addition, network 140 can include, but is not limited to, a wired (e.g., Ethernet) or a wireless (e.g., Wi-Fi, 3G, or 4G) network. Network 140 can support any of various protocols and technology including, but not limited to, Internet protocols and/or data services. While not shown in FIG. 1, network 140 may include one or more switches, firewalls, routers, gateways, or other types of intermediate network devices used to facilitate communication between various computing devices of network environment 100.

While not shown in FIG. 1, network environment 100 may also include one or more data stores or repositories for storing machine data and other data collected from various data sources, as described above. As will be described in further detail below, the collected machine data and other data may be indexed and/or segmented by data intake and query system 145 into a set of time-stamped events representing, for example, operations, transactions, records, measurements, or readings generated at each data source over a period of time. In an example, one of the data sources may be a web server, and the time-stamped events may correspond to entries within a log file generated by the web server over a given time period. The events in this example may correspond to, for example and without limitation, requests and responses related to web content to and from the web server and one or more computing devices associated with end-users of a service provided by the web server, e.g., via one or more web pages that may be loaded into a web browser executable at each end-user's device. The requests and responses may be in the form of, for example and without limitation, standard Hypertext Transfer Protocol (HTTP) requests and responses between the web server and each end-user's device. Other examples of events that may be derived from log files or other types of machine data generated by a data source include, but are not limited to, the execution of a program or script, a fault exception, an unhandled interrupt, and any security threats or other potential issues detected during the period of time. Further, an individual event may be derived from machine data corresponding to, for example, a single line of machine data within an activity log, multiple lines of machine data, a whole document, an entire configuration file, or a complete stack trace generated by the data source. Additional characteristics and features of data intake and query system 145 will be described in further detail below with respect to FIG. 2.

In an example, client 105 and user 115 may be users of a client application executable at client device 110 and user device 120, respectively. Client 105 may be, for example, a data analyst or systems engineer within an IT department of an enterprise organization, while user 115 may be, for example, a non-technical user within a business operations or marketing department of the enterprise organization. The client application executable at each device may enable client 105 and user 115 to interact with data intake and query system 145 and/or visualization system 150 for obtaining and analyzing different values of a machine data field over a selected time range, as will be described in further detail below. The client application may provide client 105 and user 115 with an interface for accessing the functionality provided by a data management system, e.g., including data intake and query system 145 and visualization system 150 of network environment 100. The interface may be, for example, a GUI and/or an application programming interface (API), for enabling client 105 and user 115, or the client application executable at each of client device 110 and user device 120, respectively, to access the functionality provided by data intake and query system 145 or visualization system 150. It should be noted that in some implementations client 105 or user 115 may be an application, a service, utility, script or program written in any of various scripting languages, which may be configured to programmatically interface with the client application executable at client device 110 or user device 120, respectively.

While not shown in FIG. 1, it should be further noted that in other implementations, visualization system 150 may be implemented as a component of the client application installed and executable at each of client device 110 and user device 120. In an example, client 105 and user 115 may use the client application executable at their respective devices to generate queries for events based on various criteria that may be specified by client 105 and user 115 via a GUI of the client application. The client application in this example may interact with a search interface to submit queries for events including a user-specified field and occurring within a particular time range of interest. Various visualizations of the query results may be displayed to client 105 and user 115 via the same or different GUI of the client application at client device 110 and user device 120, respectively.

In a further example, user 115 can utilize visualization system 150 or interface thereof provided via the client application executable at user device 120, as described above, in order to view the absolute and relative timings of events with respect to different values of a specified field over a selected time range. As will be described in further detail below, a visualization of events including each of a plurality of field values over time may be provided to the user via a GUI of the client application. The GUI may, for example, allow the user to select a desired time range for the visualization of events occurring at various points during the time range. The time range may be any time period of interest including, but not limited to, minutes, hours, days, weeks, months, years, or a custom time range within any one or a combination of the preceding time periods. In one embodiment, the time range may be defined by the scope of the events represented in an entire visualization. Although the present disclosure describes a user selection of a time range for limiting the scope of events visualized, it should be appreciated that in some embodiments, the time range for the visualization may be based on the time-stamps of the events derived from the collected machine data or other data and stored within the data store(s), as described above.

The GUI may also allow the user to select a time granularity for specifying the duration of each of a plurality of time slots within the time range, to better represent the various times during which events occur during the time range. Thus, the time granularity may be used to define the unit or duration of time covered by each time slot over the selected time range of interest. In some implementations, the duration of the time slots over the user-selected time range can be apportioned automatically without user input, e.g., based on a predefined time granularity. By way of example, if the time range is the past day (e.g., yesterday, or a preceding period of 24 hours), the time granularity may be set either automatically or by the user to 30-minute increments, thereby creating forty-eight 30-minute time slots visualized over the time range. If the time range is the past week, the time granularity may be set automatically or by the user to 12-hour increments, thereby creating fourteen 12-hour time slots visualized over the time range.

In an example, the visualization may be in the form of a heat map including a tiled or tessellated matrix of a set of rows and a set of columns, in which each of the unique values for the specified field may correspond to different rows of events, and each of the plurality of time slots for the events in each row may correspond to different columns of the heat map, as will be described in further detail below. The selected time range in this example may define a visible time range including the plurality of time slots displayed along a time axis of the visualization within a content viewing area or visualization window of the GUI. Thus, the visualization for each value of a specified field along the axis may be displayed as, for example, a row of equally-distributed time slots or "buckets" indicating the number of events occurring for each value of the specified field over the visible time range. Each time slot or bucket in this example may be used to indicate to the user that one or more events including a particular field value occurred at a particular point in time coinciding with the individual unit or duration of time represented by the time slot or bucket. In one embodiment, each time slot or bucket may be referred to, or considered to be, an "intersection" of a row corresponding to a unique one of the field values and a column corresponding to a unique one of the time slots. Alternatively, each time slot or bucket may be referred to, or considered to be, a "cell" of a table having a temporal distribution along one of the table's column and row headers, and a field value distribution over the other of the column and row headers. Also, as will be described in further detail below, the visualization of a bucket or time slot may vary according to the number of events associated with the bucket or time slot, e.g., by varying a gradient of the color or shade used to display the individual time slots or buckets within the visible time range.

In an example, the number of events (or event count) associated with each bucket or time slot for a particular field value may be based on the results of a query for events including the field value and having a time-stamp coinciding with the particular time slot within the selected time range. In some implementations, such a query may be generated dynamically by the data management system, e.g., in response to the receipt of user input specifying the field via the GUI. The criteria for the query may be based on, for example, the type of field or field values, as will be described in further detail below. Further, each query may include one search command or a series of search commands, e.g., in the form of a pipelined query or search pipeline, to be executed by a search head (e.g., search head 225 of FIG. 2, as will be described in further detail below) of the data management system. In an example, the various commands of such a search pipeline may be separated by a special operator or "pipe character" (e.g., "|") and the output or result of one command (e.g., to the left of the pipe character) may serve as the input to the next command (e.g., to the right of the pipe character). The search query in this example may be, for example, a single query (e.g., a pipelined query), which may be used to retrieve all events that occur within a given time range and that include a value for a given field of interest. Accordingly, the results obtained from executing this query may be used to identify all the different unique values for a given field of interest, all the events within the time range that include these values, and the particular points in time when these events occurred during the time range.

Figure 2:
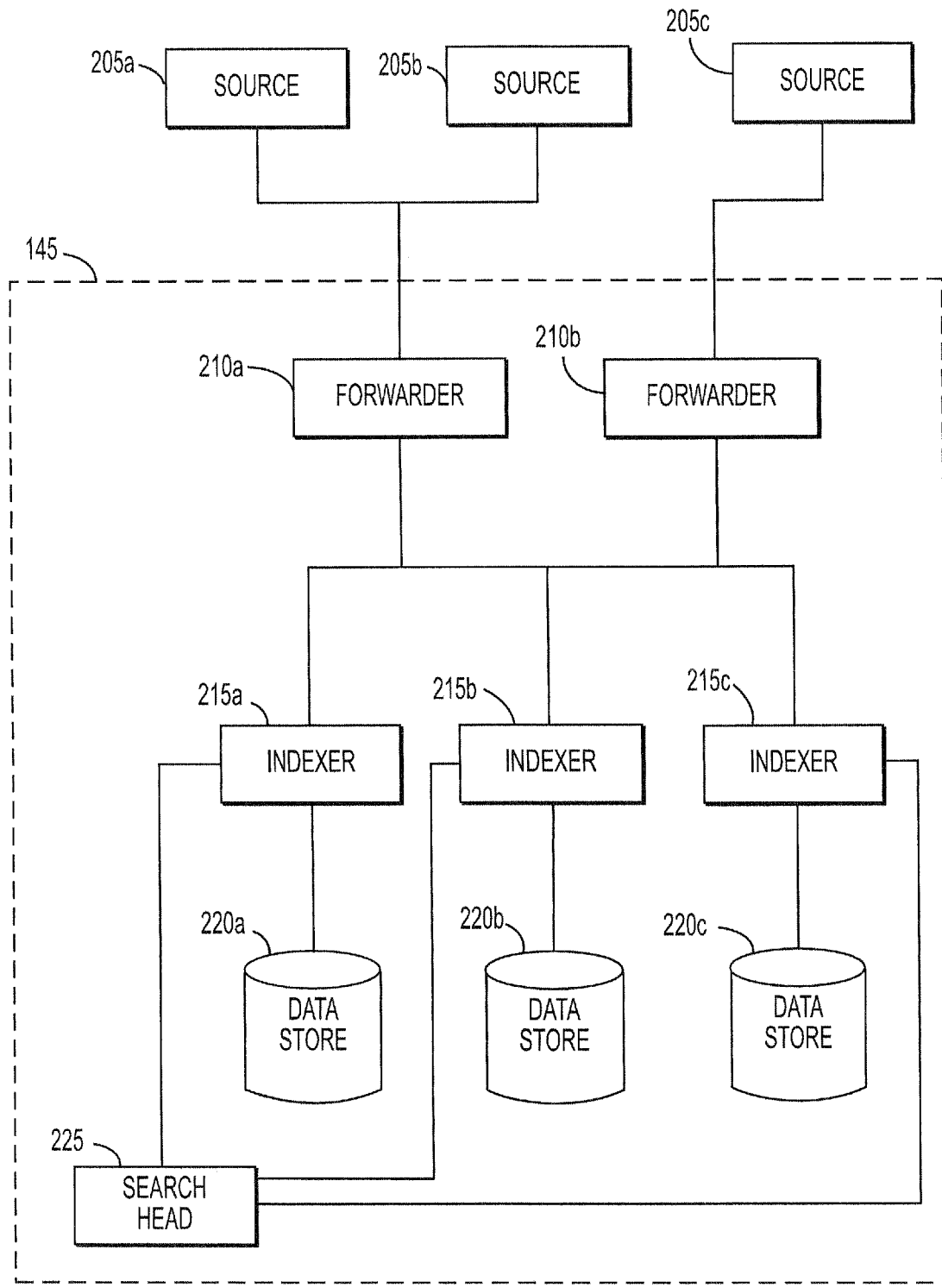
FIG. 2 shows a high-level block diagram of an exemplary data intake and query system for indexing and storing data collected from multiple sources.

FIG. 2 shows a high-level block diagram of an exemplary data intake and query system 145 for indexing time-series machine data collected from one or more data sources including, for example, any of sources 205a, 205b, and 205c. As shown in FIG. 2, system 145 may include forwarders 210a and 210b that collect data from sources 205a, 205b, and 205c and forward the data to indexers 215a, 215b, and 215c. However, it should be noted that system 145 could include a greater or fewer number of forwarders and/or indexers, as desired for a particular implementation. Further, system 145 may collect and process machine data or other data from any number of data sources, including additional data sources (not shown) that may be communicatively coupled to forwarder 210a or forwarder 210b or to one or more additional forwarders (not shown) that may be included in system 145. In an example, forwarder 210a may collect and forward streams of time-series machine data or other data generated by sources 205a and 205b to one or more of indexers 215a, 215b, and 215c. Similarly, forwarder 210b may collect and forward the time-series machine data generated by source 205c. It should be noted that the components of system 145, including forwarders 210a and 210b, indexers 215a, 215b, and 215c, and/or search head 225, may be implemented at a single server or across multiple servers or computing devices that are communicatively coupled in a distributed network environment (e.g., servers within a server farm).

Data sources 205a, 205b, and 205c may include computers, routers, databases, operating systems, and applications. Each of data sources 205a, 205b, and 205c may generate one or more different types of machine data including, but not limited to, server logs, activity logs, configuration files, messages, database records, and the like. The machine data or other data produced by data sources 205a, 205b, and 205c may arrive at forwarder 210a or forwarder 210b as, for example, a series of time-stamped records of relevant activities or operations occurring at each data source over time. Further, such time-series machine data may be collected by forwarder 210a or 210b in real-time, e.g., as a real-time data stream or feed to which forwarder 210a or 210b may be subscribed. Alternatively, the machine data may be collected or retrieved by forwarder 210a or 210b from each data source at periodic time intervals.

In the example shown in FIG. 2, indexers 215a, 215b, and 215c may receive the collected machine data from forwarders 210a and 210b and process the data into events. The events may be searchable and indexed to allow for fast keyword searching. At any time, a schema defining one or more fields within the events may be generated. After generation of the schema, a subsequent search may utilize each field that is defined by specifying search criteria relating to values for that field. The extraction of a value for a field from an event may occur at either index time, storage time, or search time. For field extraction at search time, the schema may be referred to as a "late-binding schema," as will be described in further detail below. The indexed events may be stored within one or more of data stores 220a, 220b, and 220c. As shown in FIG. 2, system 145 may also include a search head 225 for searching events, and any searches may include criteria for selection of events and any already defined fields included in the events that are stored within data stores 220*a*, 220*b*, and 220*c*. Each of data stores 220*a*, 220*b*, and 220*c* may be implemented using any type of recording medium for storing different types of data accessible to indexers 215*a*, 215*b*, and 215*c* and search head 225. In some implementations, search head 225 may search events and fields in real-time, without having to access data stores 220*a*, 220*b*, or 220*c*. For example, search head 225 may receive real-time streams of indexed event data directly from indexers 215*a*, 215*b*, and 215*c*. In an example, indexers 215*a*, 215*b*, and 215*c*, data stores 220*a*, 220*b*, and 220*c*, and search head 225 may represent different parts of a distributed network environment (e.g., enterprise network environment 100 of FIG. 1, as described above) for indexing, storing, and searching events derived from machine data and other data (e.g., mobile or network data) collected from data sources 205*a*, 205*b*, and 205*c*. As will be described in further detail below with respect to the exemplary method of FIG. 3, search head 225 in this example may serve as a centralized search manager or module for handling search-related functions including, but not limited to, directing search requests to a set of search peers, e.g., indexers 215*a*, 215*b*, and 215*c*, and then, merging the results from each search peer for display to the user. Accordingly, search head 225 may be implemented using, for example, a centralized server communicatively coupled to indexers 215*a*, 215*b*, and 215*c* and data stores 220*a*, 220*b*, and 220*c* via a network (e.g., network 140 of FIG. 1, as described above) within the distributed network environment (e.g., enterprise network environment 100 of FIG. 1). In one embodiment, the search head may request that each of the various distributed indexers, in parallel, find relevant partial search results responsive to the query, and to return those results to the search head. The search head may aggregate the received partial results to determine a final results set for producing a list of events or visualization of events for display at or to the client. In one embodiment, the assignment of parallel processing of searches to the various distributed indexers on their partial event stores may be referred to as a "map-reduce" process.

As noted above, the components of system 145, including forwarders 210*a* and 210*b*, indexers 215*a*, 215*b*, and 215*c*, and/or search head 225, may be implemented at a single server or across multiple servers or computing devices that are communicatively coupled in a distributed network environment. For example, each component may be implemented using a different computing device having at least one processor, a memory, and a network communications interface. Similarly, data stores 220*a*, 220*b*, and 220*c* may be implemented using separate data storage devices that may be accessible to the other components of system 145 via a network (e.g., network 140 of FIG. 1, as described above). In some implementations, data stores 220*a*, 220*b*, and 220*c* may be coupled to or integrated with indexers 215*a*, 215*b*, and 215*c*, respectively, and the stored data within data stores 220*a*, 220*b*, and 220*c* may be made accessible to search head 225 via an interface provided by each of indexers 215*a*, 215*b*, and 215*c*, respectively.

Additional details of the features and operations of system 145, including forwarders 210*a* and 210*b*, indexers 215*a*, 215*b*, and 215*c*, data stores 220*a*, 220*b*, and 220*c*, and search head 225, will be described below with respect to FIG. 3. Furthermore, the systems and techniques disclosed herein, including with respect to data intake and query system 145 of FIGS. 1 and 2 and the exemplary methods of FIGS. 3 and 4A-4C, as will be described below with reference to FIGS. 1 and 2, are further discussed and elaborated upon in the following references: Carasso, David. Exploring Splunk Search Processing Language (SPL) Primer and Cookbook. New York: CITO Research, 2012; and Ledion Bitincka, Archana Ganapathi, Stephen Sorkin, and Steve Zhang. Optimizing data analysis with a semi-structured time series database. In SLAML, 2010. Each of these references is incorporated herein by reference in its entirety.

Figure 3:
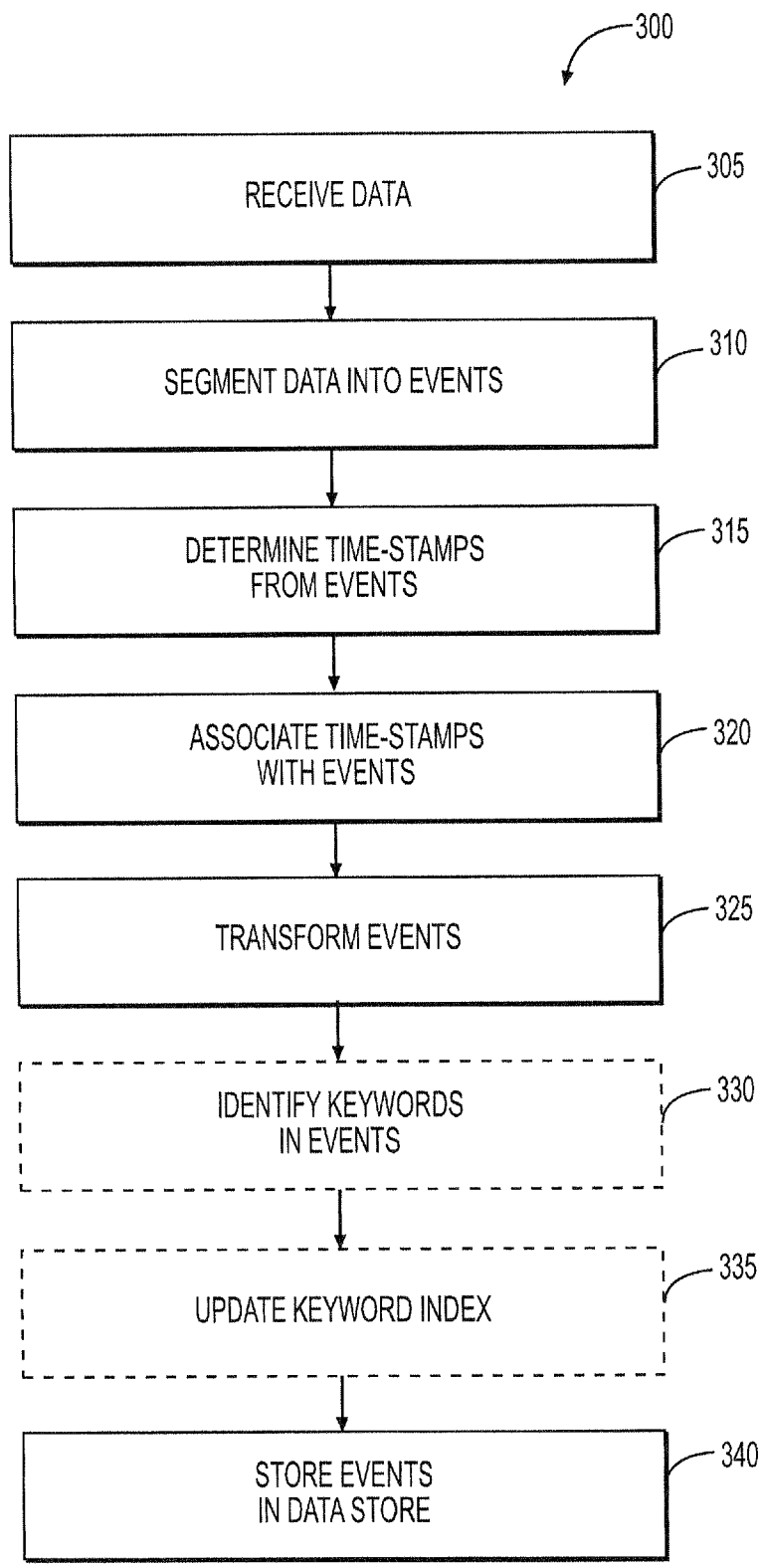
FIG. 3 illustrates a process flowchart of an exemplary method for segmenting and storing events derived from data collected from various data sources.

FIG. 3 illustrates a process flowchart of an exemplary method 300 for segmenting and storing events derived from machine data or other data collected from various data sources. While method 300 will be described using data intake and query system 145, as shown in the above-described examples of FIGS. 1 and 2, it should be noted that method 300 is not intended to be limited thereto. In an example, the steps of method 300 may be performed by indexers 215*a*, 215*b*, and 215*c* of FIG. 2, as described above. Although the principles of the present disclosure contemplate that steps of method 300 may be performed in the order depicted in FIG. 3, it should be appreciated that one or more of these steps may be performed in a different order or may be omitted altogether. Furthermore, it should be appreciated that method 300 may include additional steps than those shown in FIG. 3, e.g., as desired or needed for a particular implementation.

Method 300 begins in step 305, which includes receiving data generated by one or more sources, e.g., sources 205*a*, 205*b*, and 205*c* of FIG. 2, as described above. The generated data may be machine data (e.g., log files) or other computer, network, and/or mobile device data including, but not limited to, measurements relating to the performance of an IT or network infrastructure component (e.g., a computer cluster, host, node, or virtual machine) or those captured by a sensor device within a distributed network environment (e.g., enterprise network environment 100 of FIG. 1, as described above). The data may be received from one or more forwarding devices or forwarders (e.g., forwarders 210*a* and 210*b* of FIG. 2). In step 310, the received data is segmented or transformed into events. The events may be segmented according to one or more event boundaries that may be found within the received data. Examples of such event boundaries include, but are not limited to, predefined characters or character strings. These may include certain punctuation marks or special characters including, for example, carriage returns, tabs, spaces, or line breaks. In some instances, event boundaries may be discovered automatically by the software, and in other instances, they may be configured and/or predefined by the user.

A time-stamp may also be determined for each event in step 315. The time-stamp can be determined by any suitable means, including, e.g., extracting a time field from data in an event or by interpolating the time based on time-stamps extracted from other events occurring shortly before or after the event within a particular time frame of activity associated with the same data source. In some implementations, the time-stamp for an event may correspond to the time the event data was received or generated. The time-stamp determined for each event is associated with the event in step 320. For example, the time-stamp may be stored as metadata for the event.

In step 325, the data included in a given event may be optionally transformed. Such a transformation may include, for example, removing part of an event (e.g., a portion used to define event boundaries) or removing redundant portions of an event. A user or client may specify a portion to remove using a regular expression or other type of input provided via an interface of the data intake and query system described herein.

Optionally, a keyword index can be generated to facilitate fast keyword searching of events. To build such an index, method 300 may proceed to steps 330 and 335. In step 330, a set of keywords or tokens included within the events may be identified. In step 335, each identified keyword or token may be added to a keyword index associating the keyword/token with one or more events that each include the keyword/token. In some implementations, the keyword index may include a pointer for each keyword to the corresponding event(s) including that keyword (or locations within events where the particular keyword may be found). Alternatively, the keyword index may include some other type of reference or indicator specifying how the events including each keyword may be retrieved. When a keyword-based query is received by an indexer, the indexer may then consult this index to relatively quickly find those events containing the keyword without having to examine again each individual event, thereby greatly accelerating keyword searches.

In step 340, the events are stored in one or more data stores (e.g., data stores 220a, 220b, and 220c of FIG. 2). The data also may be stored in a working, short-term, and/or long-term memory in order to decrease query execution time. The time-stamp may be stored along with each event to help optimize searching the events by time range. In some implementations, the time-stamps may be used to distribute the stored data across a plurality of individual time slots, each of which may correspond to a storage location for events having time-stamps that coincide with the time slot. An event then can be associated with a storage location corresponding to a time slot representing a time period that is inclusive of the event's time-stamp. This may help optimize time-based searches by allowing events with recent time-stamps that may have a higher likelihood of being accessed to be stored at preferable memory locations (such as flash memory instead of hard-drive memory) that lend to quicker subsequent retrieval.

Referring back to the example shown in FIG. 2, data stores 220a, 220b, and 220c may be distributed across multiple indexers 215a, 215b, and 215c, where each indexer may be responsible for storing and searching a subset of the events generated by system 145. In some implementations, the stored event data may be distributed among indexers 215a, 215b, and 215c so as to enable parallel searching of events in response to a query initiated by a user or client (e.g., user 115 or client 105 of FIG. 1) within an enterprise network environment (e.g., enterprise network environment 100 of FIG. 1). As will be described in further detail below, partial query results returned by each of indexers 215a, 215b, and 215c may be combined by search head 225 in order to produce a complete set of results in response to the user's query.

Also, as will be described in further detail below, a visualization system (e.g., visualization system 150 of FIG. 1, as described above) of the enterprise network environment may provide various GUIs enabling the user to initiate different queries and receive a representation of the distribution of events that include a particular field and the values for that field in the events occurring over a selected time range.

In an example, a set of default or predefined fields may be extracted from the event data at index time or storage time, e.g., by indexers 215a, 215b, and 215c. Other fields may be defined and included in the schema for the events at any time, up to and including search time. Examples of default fields or metadata that may be determined for each event include, but are not limited to, host, source, source-type, and time (e.g., based on the time-stamp for the event), as described above. In another example, a value for a field may be extracted from an event at search time, and the schema in this example may be referred to as a late-binding schema, as mentioned above and as will be described in further detail below. The extraction rule for a field may include a regular expression (or "regex" or any other suitable expression) or any other rule for how to extract a value from an event. In some implementations, the visualization system may provide the user with an interactive field extraction functionality via the GUI, which enables the user to create new custom fields. Additional details of the features and operations of the visualization system will be described below with respect to FIGS. 4A and 4B.

Figure 4A:
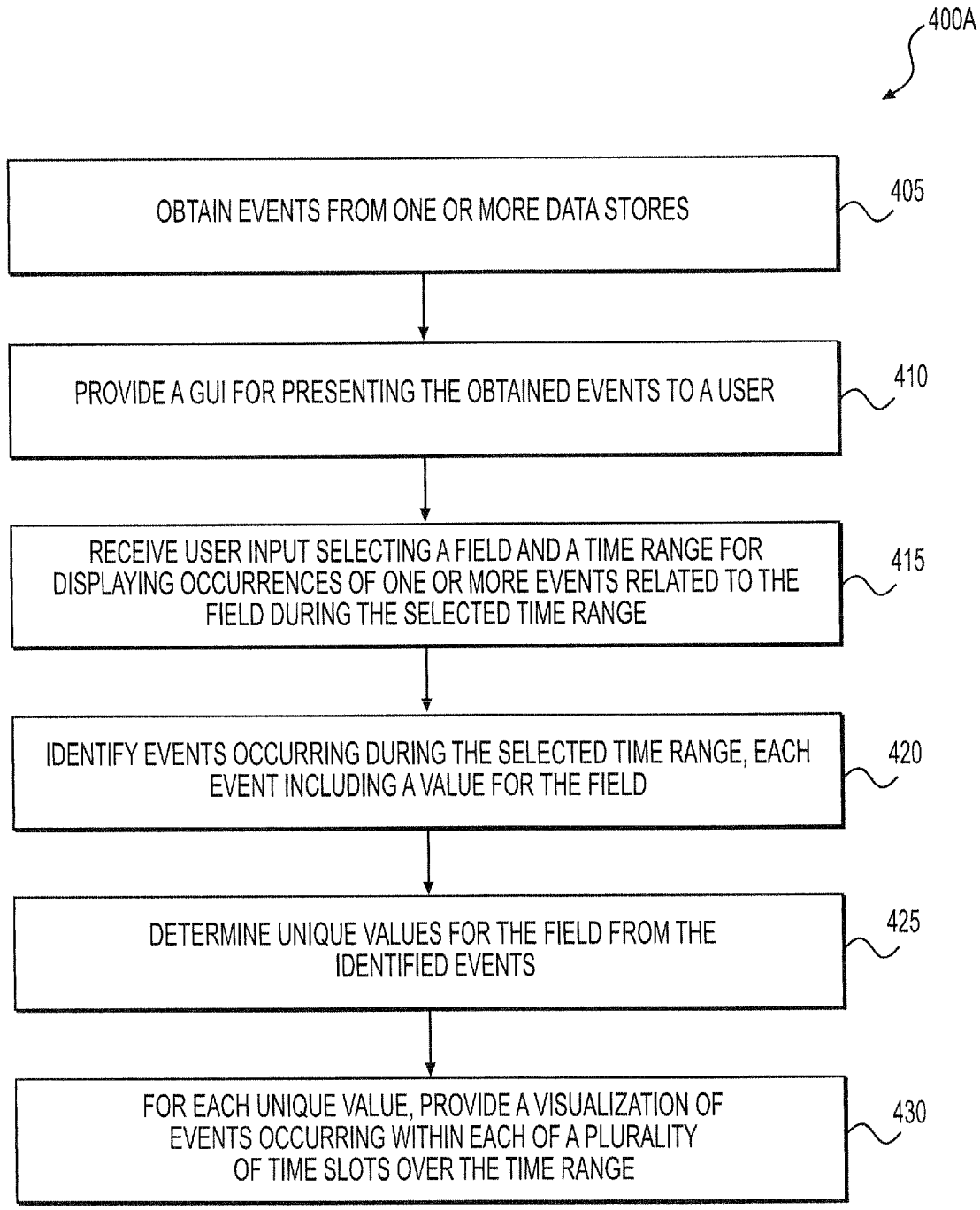
FIG. 4A illustrates a process flowchart of an exemplary method for providing a visualization of a count of events having values for a specified field in different time periods over a selected time range, where the events may have been derived from collected data including, e.g., machine data.

FIG. 4A illustrates a process flowchart of an exemplary method 400A for providing a visualization of values for a specified field in events that may be derived from data, e.g., machine data, and that occur during a selected time range. For purposes of discussion, method 400A will be described using enterprise network environment 100 of FIG. 1, including visualization system 150 of FIG. 1 and data intake and query system 145 of FIGS. 1 and 2, as described above. However, method 400A is not intended to be limited thereto. In an example, the steps of method 400A may be performed by one or more components (e.g. visualization system 150 and/or data intake and query system 145) of a data management system within an enterprise network environment (e.g., enterprise network environment 100). Although the principles of the present disclosure contemplate that steps of method 400A may be performed in the order depicted in FIG. 4A, it should be appreciated that one or more of these steps may be performed in a different order or may be omitted altogether. Furthermore, it should be appreciated that method 400A may include additional steps than those shown in FIG. 4A, e.g., as desired or needed for a particular implementation.

As shown in FIG. 4A, method 400A begins in step 405, which includes obtaining events from one or more data stores (e.g., one or more of data stores 220a, 220b, and 220c of FIG. 2, as described above). As described above, these events may be derived from collected data generated by one or more data sources (e.g., one or more of data sources 205a, 205b, and 205c of FIG. 2). The collected data may include, but is not limited to, machine data (e.g., in the form of web logs), performance measurements of an IT component, and/or sensor measurements. Also, as described above, the events may be segmented or transformed into a series of time-stamped events, and then indexed (e.g., b/one or more of indexers 215a, 215b, and 215c of FIG. 2) and stored within the one or more data stores so as to enable searching of events occurring within a time range by keyword, token, or name associated with a field whose values may be extracted from events including the field. The time range and field may be specified by a user via, for example, one or more GUIs of a client application executable at the user's device (e.g., client device 110 or user device 120 of FIG. 1, as described above). The time range may be any period of time specified by the user. Alternatively, the time range may be based on, for example, the range of time-stamps associated with the events obtained in step 405. In an example, the selected time range may be based on user input received via a GUI, e.g., the same or a different GUI from that provided in step 410 for presenting the obtained event information to a user, e.g., for data analysis purposes.

In step 410, method 400A may further include providing a GUI for presenting the obtained events to a user. The GUI in this example may be provided to the user via, for example, a client application executable at the user's computing device (e.g., user device 120 of FIG. 1, as described above). In some implementations, the client application may be a web browser executable at the user's device, and the GUI may be provided by the data management system as part of a web service accessible to the user via a web page loaded within the web browser. Alternatively, the client application may be a standalone software application executable at the user's device for providing the visualization functionality described herein.

In step 415, input may be received from the user via the GUI. The received input may specify a field and a time range for displaying occurrences of one or more events including the field during the selected time range. As described above, the field and the time range may be selected by the user via the same or different GUI provided by the client application executable at the user's device. In an example, the field selected by the user may be extracted from the events at search time, e.g., at the time a query including one or more search commands (e.g., in a search pipeline) is executed for a late-binding schema, as described above and as will be described in further detail below. Such a search-time field extraction may be based on, for example, a field definition or configuration specified by the user via an interactive field extraction functionality accessible through the GUI, through regular expressions included within a configuration file accessible to the data intake and query system, or through a search command provided as part of the query itself. In some implementations, the user may specify the field via an input control element provided by the GUI, e.g., by selecting a desired field from a list of fields extracted from the events and prepopulated within a menu, dropdown window, or other type of control element for field selection, as provided by the GUI for a particular implementation. The list of fields may also include, for example, any default fields and/or user-defined fields that were extracted from the events at index and/or storage time.

Method 400A then proceeds to step 420, which may include identifying events occurring during the selected time range, where each event includes a value for the field and has a time-stamp that falls within the time range. In step 425, unique values for the specified field may be determined from the identified events. In an example, the determination in step 425 may include extracting values for the field based on a schema or definition of the field, which may be used to execute queries for events including the field and occurring within the time range. Each field in a schema may be defined for a subset of the events in a data store and may specify how to extract a value from each of the subset of events for which the field has been defined. Extraction rules for a field may be defined using, for example, a regular expression, which may be associated with a logical type of information that is included within an event for which each rule is defined.

In some implementations, the data management system of the enterprise network environment in this example may employ the specialized type of schema, referred to herein as a "late-binding schema," as noted previously. As alluded to above, such a late-binding schema may not be defined or applied by the data intake and query system at the time of indexing the collected data, as typically occurs with conventional database technology. Rather, in a system using late-binding schema, the schema can be developed on an ongoing basis up until the time it needs to be applied, e.g., at query time. In an example of a data intake and query system (e.g., data intake and query system 145 of FIGS. 1 and 2, as described above) using a late-binding schema, the query may specify, for example, a search for events that have certain criteria defined by the schema for specified fields and the events including such fields. At search time, the values for the specified fields may be extracted and compared to the search criteria. An advantage of such a late-binding schema may include enabling a user, e.g., a data analyst, to perform data analysis in order to learn more about data included within events indexed from collected machine data, while also allowing the user to continue developing the schema until, for example, it is needed again for executing a subsequent query to locate data within events.

Figure 5A:
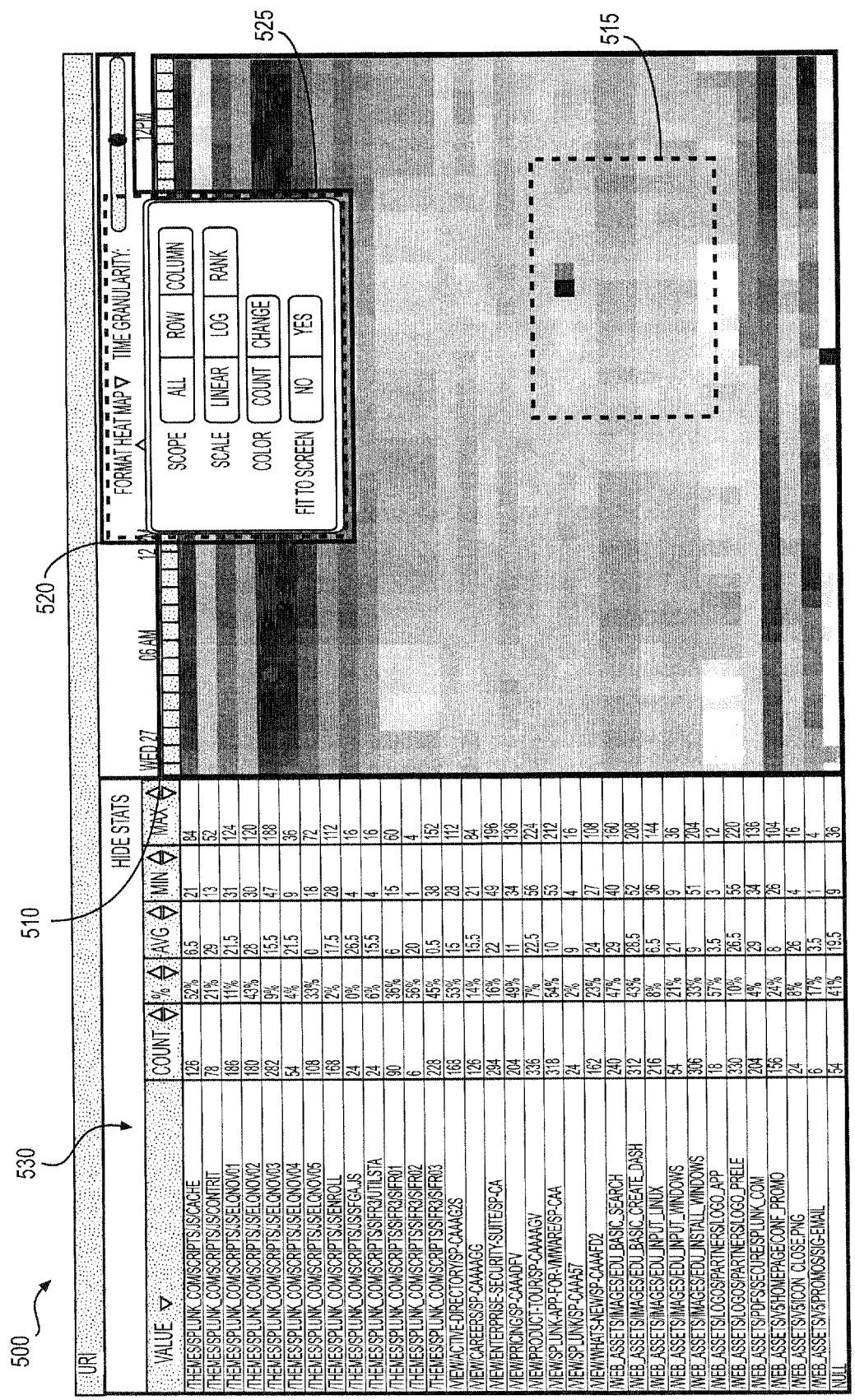
FIG. 5A illustrates an exemplary graphical user interface (GUI) for displaying a value table and a heat map visualization of events having values for a categorical field over a selected time range, where the events may have been derived from collected machine data.

In step 430, a visualization of events occurring during the time range may be provided for each unique value of the field. The visualization provided in step 430 may indicate, for example, the number of events occurring at each of a plurality of time slots that are equally distributed over the selected time range. As will be described in further detail below, the size or duration of each time slot may be based on, for example, a time granularity specified by the user via the GUI. As described above, the specified time granularity may be used to distribute the events identified in step 420 across a plurality of buckets or time slots over the selected time range, where each time slot may correspond to the same unit, increment, or period of time within the time range, as displayed along a time axis for the visualization. Thus, for each unique value of the specified field, each identified event including that value for the specified field and occurring within the specified time range based on its time-stamp may be assigned to an appropriate time slot within the time range. The unit or period of time for each time slot may be, for example, a predetermined number of seconds, hours, days, weeks, etc. An example of such a visualization is shown in FIG. 5A and will be described in further detail below.

Figure 4B:
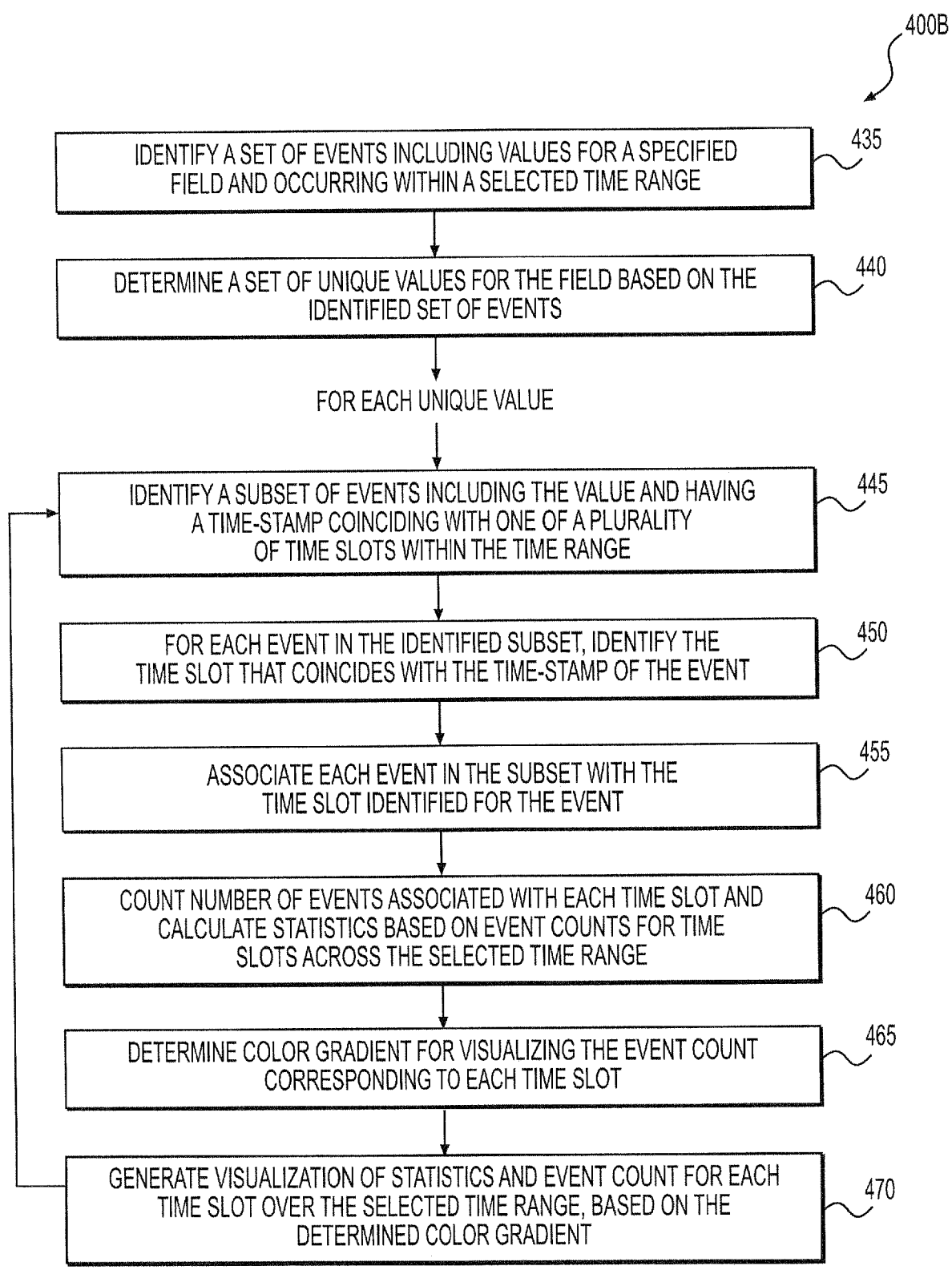
FIG. 4B illustrates a process flowchart of an exemplary method for generating a visualization of events having values for the specified field in FIG. 4A.

FIG. 4B illustrates a process flowchart of an exemplary method 400B for generating a visualization of values for the specified field in FIG. 4A, e.g., as described above with respect to step 430 of method 400A. Although the principles of the present disclosure contemplate that steps of method 400B may be performed in the order depicted in FIG. 4B, it should be appreciated that one or more of these steps may be performed in a different order or may be omitted altogether. Furthermore, it should be appreciated that method 400B may include additional steps than those shown in FIG. 4B, e.g., as desired or needed for a particular implementation. Like method 400A, method 400B will be described using enterprise network environment 100 of FIG. 1, including visualization system 150 of FIG. 1 and data intake and query system 145 of FIGS. 1 and 2, as described above, for purposes of discussion only, and method 400B is not intended to be limited thereto.

Method 400B may begin in step 435, which may include identifying a set of events including values for a specified field and occurring within a selected time range. As described above, the field and the time range may be based on input received from a user (e.g., at step 415 of method 400A of FIG. 4A). For example, the user input may be received via, for example, a GUI of a client application executable at the user's device for providing data analysis functionality to the user of a data management system within an enterprise network environment (e.g., enterprise network environment 100 of FIG. 1), as described above. Alternatively, the field and/or time range may be determined automatically or by default.

In one exemplary embodiment, the events may be identified in step 435 by executing a query for events including the particular field. As described above, a set of events may be derived from data collected from one or more data sources within an enterprise network environment (e.g., enterprise network environment 100 of FIG. 1, as described above) and processed by a data intake and query system (e.g., data intake and query system 145 of FIGS. 1 and 2) within the enterprise network environment. In some implementations, the data intake and query system may include multiple indexers (e.g., indexers 215*a*, 215*b*, and 215*c* of FIG. 2) and multiple data stores (e.g., data stores 220*a*, 220*b*, and 220*c* of FIG. 2) distributed across the indexers. Each indexer may be responsible for indexing and storing at least a portion of the set of events derived from the data collected from the data sources, as described above. The indexers may also be utilized by a search head (e.g., search head 225 of FIG. 2) to execute the query (e.g., including a series of search commands in a search pipeline) for events including the field value. By distributing the search process amongst the various indexers, e.g., which may be able to search for events responsive to a query in parallel, the search head can utilize the indexers to execute the query and obtain query results in a shorter amount of time. It should be noted that the indexers might use any conventional or proprietary search technique for executing the query. Also, as each indexer may store only a portion of the entire set of events and thus, produce only a partial set of search results in response to the query, the search head (e.g., search head 225 of FIG. 2) may be configured to combine the partial results from each indexer in order to form a complete or final set of search results in response to the query, as will be described in further detail with respect to FIG. 4C.

Figure 4C:
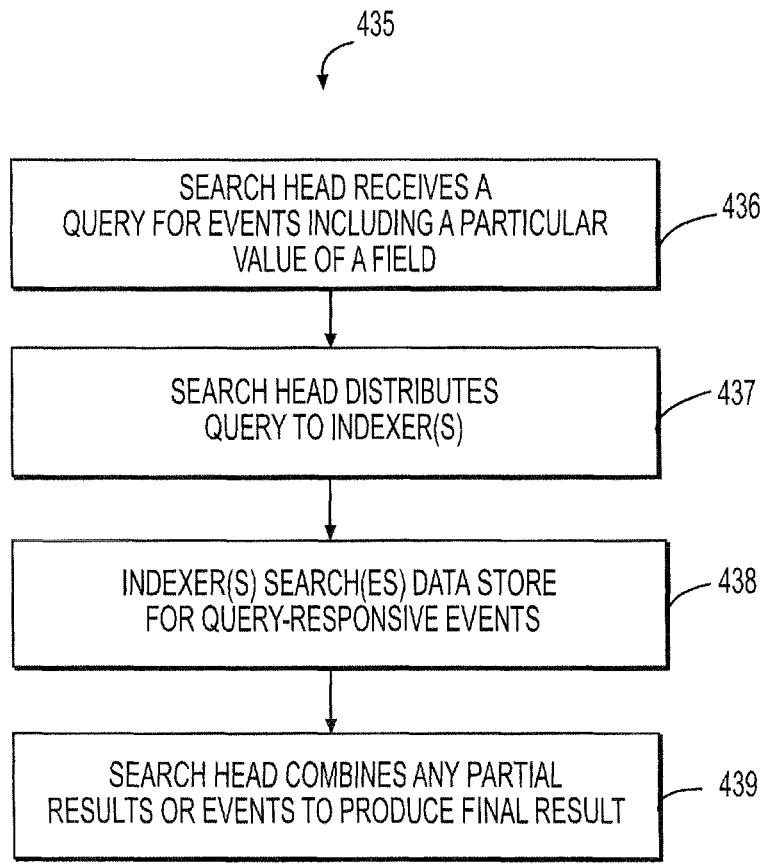
FIG. 4C illustrates a process flowchart of an exemplary method for executing a query for a set of events that may be derived from data.

FIG. 4C illustrates a process flowchart of an exemplary method for performing the event identification in step 435 of method 400B of FIG. 4B by executing a query for events that include any of the values identified for the specified field in step 435 of method 400B of FIG. 4B, as described above. Also, as described above, the query may be executed by, for example, a search head (e.g., search head 225, as described above), which may be part of a data management or data intake and query system (e.g., data index and query system 145 of FIGS. 1 and 2) within the enterprise network environment (e.g., enterprise network environment 100 of FIG. 1). Although the principles of the present disclosure contemplate that steps of this method may be performed in the order depicted in FIG. 4C, it should be appreciated that one or more of these steps may be performed in a different order or may be omitted altogether. Furthermore, it should be appreciated that this method may include additional steps than those shown in FIG. 4C, e.g., as desired or needed for a particular implementation.

As shown in step 436 of FIG. 4C, a search head may receive a query for events including a value of the specified field. The query may be based on, for example, input received from a user via a GUI or other interface of a client application executable at the user's device, as described above. In an example, the input from the user may be used by the client application to generate a search request that is sent to the search head for events including a particular field and/or a particular field/value pair. In step 437, the search head may distribute the received query or search request to one or more distributed indexers (e.g., indexers 215*a*, 215*b*, and 215*c* of FIG. 2, as described above). These indexers can include those with access to data stores having events responsive to the query. The events may be indexed and stored within one or more data stores, e.g., data stores 220*a*, 220*b*, and 220*c* of data intake and query system 145 of FIG. 2, as described above. For example, the indexers can include those with access to events with time-stamps within a part or all of a time period identified in the query. In step 438, each of the one or more indexers to which the query may be distributed searches its data store for events responsive to the query. To determine events responsive to the query, a searching indexer may find events specified by the criteria in the query. Such criteria can include an indication that the events being queried have particular keywords or contain a specified value or values for a specified field or fields. As a late-binding schema may be used, as described above, extraction of values from events based on the specified criteria may occur at the time that the query is processed, e.g., as opposed to the time that the machine data is indexed, segmented, or stored in the form of events. It should be appreciated that, to achieve high availability and to provide for disaster recovery, events may be replicated in multiple data stores, in which case indexers with access to the redundant events would not respond to the query by processing the redundant events. The indexers may either stream the relevant events back to the search head or use the events to calculate a partial result responsive to the query and send the partial result back to the search head. In step 439, the search head combines all the partial results or events received from the parallel processing together to determine a final result responsive to the query.

Referring back to method 400B of FIG. 4B, in step 440, a set of unique values for the field may be determined based on the identified set of events. For example, method 400B may include extracting all of the values for the specified field among all of the events identified in step 435, and de-duplicating the values to obtain a list or set of unique values for the specified field. Method 400B may then proceed to steps 445, 450, 455, 460, 465, and 470, some or all of which may be performed for each unique value of the field.

In step 445, for each unique value, a subset of the events having a value matching the unique value may be identified, where each event in the identified subset has a time-stamp coinciding with one of a plurality of time slots within the time range, as described above. Also, as described above, the number of time slots and duration of each of the time slots may be based on a predetermined time granularity or may be determined based on a time granularity set by the user via the GUI for the visualization. Once the subset of events that include the particular unique value for the field is identified in step 445, the appropriate time slot for each event in the identified subset may be identified in step 450, and in step 455, the identified time slot may be associated with the corresponding event in the identified subset. In some implementations, an association between each event and the corresponding time slot may be created programmatically using, for example, a memory pointer or other type of reference object linking the event to the appropriate time slot. Such a pointer or linking reference may be associated with an instance of the event, e.g., as it is represented and stored within one or more data stores, e.g., data stores 220*a*, 220*b*, and 220*c* of data intake and query system 145 of FIG. 2, as described above.

Step 460 includes counting the number of events associated with each time slot, and calculating statistics based on the event count for each of the time slots distributed across the selected time range. The event count may be used to determine a gradient for a color (or shade) in step 465, which may be used for visualizing the time slots for each field value according to the corresponding event counts. A visualization of the calculated statistics and event count for each time slot over the selected time range is generated in step 470 based on the gradient, as will be described in further detail below with respect to FIGS. 5A-11D.

FIG. 5A illustrates an exemplary GUI 500 for displaying a visualization of values for a specified field in events falling within a selected time range, as described above. GUI 500 may be provided within, for example, a client application executable at a user's device (e.g., user device 120 of FIG. 1) for providing access to the data analysis functionality of a data management system within an enterprise network environment (e.g., enterprise network environment 100 of FIG. 1), as described above. The visualization in the example shown in FIG. 5A is in the form of a heat map. However, it should be noted that the techniques disclosed herein are not intended to be limited thereto, and that any type of visualization of the values for a field may be provided to the user via GUI 500.

As shown in FIG. 5A, GUI 500 includes a visualization window 510, a visualization control panel 520, and a value table 530. Visualization window 510 may be used for presenting a view of the heat map visualization to the user in this example. The heat map visualization may be presented for a single field, e.g., as specified by the user via a different GUI or control window (not shown) provided to the user via GUI 500, where each row of the heat map is used to display the timing of events having the value corresponding to that row as their value for the field. The heat map visualization provided within window 510 may be used to graphically represent, for example, the event count distribution for each value (i.e., shown in each row) in time slots across a selected time range, as described previously.

In the example shown in visualization window 510, the heat map displayed for each row, which corresponds to a unique value for the selected field, may be divided into a plurality of individually colored or shaded boxes or regions, each representing a time slot or "bucket" and whose color or shade indicates the number of events having the value for the field represented by that row and that have a time-stamp falling within the time slot, as described previously. The amount of time represented by each of the time slots or buckets in the heat map may be based on, for example, a time granularity specified by the user, e.g., based on user input received via a time granularity control element of the GUI, as shown in FIG. 9C, which will be described in further detail below. Thus, each time slot or bucket shown in each row of the heat map may be used to indicate the event count or number of events that include the particular field value and that occur at a time coinciding with the unit or period of time allocated to the time slot. A color gradient, shading, texture, or any other suitable visual indication may be used to indicate the event count represented by a time slot or bucket in the heat map. In some implementations, the visualization of each heat map box, e.g., each square-shaped region, corresponding to a particular time slot or heat map bucket may be adjusted according to its relative event count density compared to other heat map boxes in the entire heat map, the same row of the heat map, or the same column of the heat map. The size and shape of each box or region of the heat map may also indicate this relative event count density compared to other heat map boxes in the same row or column. In an example, the size of visualized heat map boxes or regions corresponding to relatively greater event counts densities (and thus, representing a larger number of event counts) may be relatively larger than those heat map boxes/regions having relatively lower event count densities. In an example, an outline or boundary may be visualized, e.g., as an overlay, surrounding particular heat map regions so as to highlight or otherwise visually accentuate each region to the user as it is displayed within visualization window 510. As will be described in further detail below, it should be noted that the relevant heat map boxes or regions for the visualization may include, for example, those selected by the user via GUI 500, e.g., by manipulating one or more control elements using a mouse or other type of user input device.

Figure 9A:
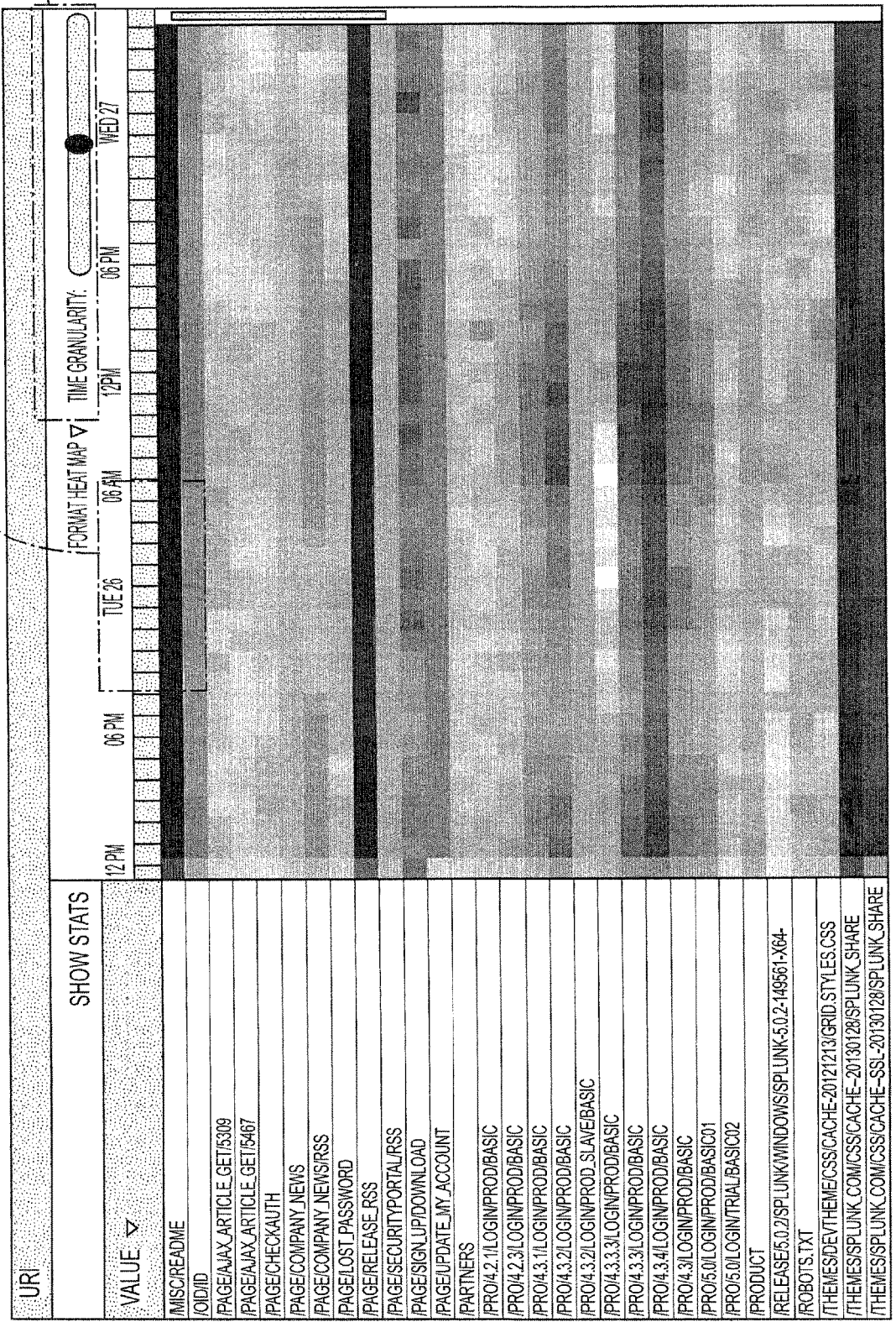
FIGS. 9A-9C illustrate detailed views of various time range control elements of the GUI shown in FIG. 7.
Figure 9B:
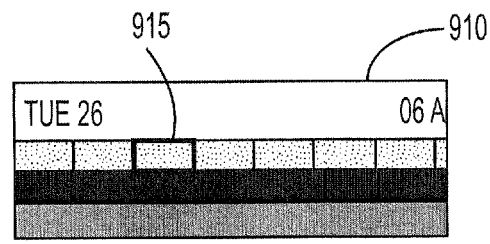
Figure 9C:
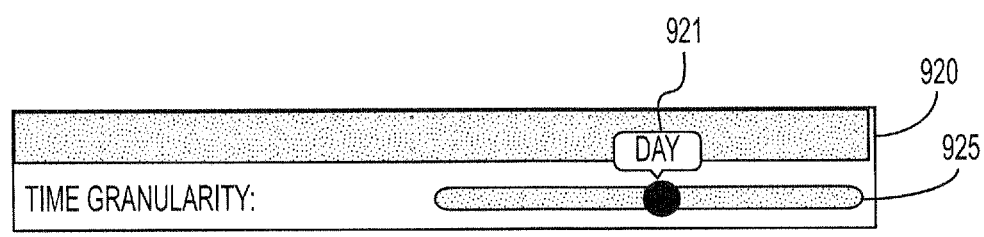

Various time-related controls may be provided to the user, as shown in FIGS. 9A-9C. In particular, FIG. 9B shows a segment 910 of a header row displayed for the heat map visualization shown in FIG. 9A. As shown in segment 910 of FIG. 9B, the header row may be divided into a plurality of time increments corresponding to the different time slots and columns for the heat map, as described above. In some implementations, the GUI may provide the user with a sort function that sorts all the rows (including both the rows of the value table 530 and the rows of window 510 of FIG. 5A) based on increasing or decreasing counts for time slots in a chosen column, where a given row's place after row sorting corresponds to the count of events for the time slot in that row that is also within the chosen column. All columns of the heat map visualization may be sortable. As shown in the example of FIG. 9B, the user may use a mouse or other user input device to select a column corresponding to a time increment 915 in order to sort the rows based on the counts of events in time slots in the chosen column. The rows may be sorted in either an ascending or descending order based on these counts. In a further example, the GUI may enable the user to reorder the rows of the heat map visualization by using a drag and drop gesture with a user input device, e.g., a mouse, other type of pointer device, or the user's finger for a touch gesture via a touch-screen display. For example, the user may use the user input device to select one or more rows corresponding to one or more values of the field within the heat map visualization and change the order of the heat map rows by dragging the selected row(s) from their original location to a desired destination location within the heat map visualization.

FIG. 9C shows an exemplary time granularity control 920 including a slider control 925, which may be controlled by the user in order to change the time granularity. However, it should be noted that control 925 is not limited to a slider control and that any other type of user control element suitable for enabling the user to change the time granularity may be used to implement control 925. Examples of such other types of user controls include, but are not limited to, a menu control, a pop-up window, one or more checkboxes, one or more radio buttons, a spinner control, tabs, etc. Further, while not shown in FIGS. 9A-9C, additional controls, e.g., one or more date or time picker controls, may be provided for enabling the user to select a desired time window or time range (e.g., visible time range) of events to be represented by the visualization provided in the GUI for each of the values of the specified field. Examples of different time granularity options that may be selected using control 925 include, but are not limited to, seconds, minutes, hours, days, weeks, and months. As shown in FIG. 9C, a control element 921 including information related to the particular time granularity currently selected by the user may be displayed in conjunction with control 925. Control element 921 may be implemented as, for example, an informational tooltip within a window or dialog box (e.g., a "hover box") displayed when the user selects or hovers a selection pointer over an appropriate portion of control 925 using a mouse or other user input device.

Referring back to FIG. 5A, visualization control panel 520 of GUI 500 may provide various controls enabling the user to configure or customize the particular type of visualization presented within visualization window 510. Value table 530 may include a plurality of rows corresponding to the values identified for the specified field. Value table 530 may also include relevant statistics calculated from the event counts for time slots in the row corresponding to the statistics. As shown in FIG. 5A, the various statistics that may be calculated and displayed for each row may include, for example and without limitation: a "Count" statistic indicating the total count of events in the selected time range in all the time slots of that row; "%" indicating the percentage of events having the value for the field represented by a given row that are covered in the visible time range as a percentage of such events in the selected time range; "Avg" indicating the average number of events per time slot or bucket within the row; "Min" for indicating the minimum number of events in any of the time slots or buckets in the selected time range; and "Max" for the maximum number of events in any of the time slots or buckets in the selected time range. Those skilled in the relevant art would appreciate that any number of other statistical calculations may be performed and displayed within value table 530, as appropriate or desired for a particular implementation. In some implementations, the user may select a "Min" or "Max" statistic displayed in table 530 for a particular field value, e.g., by using a mouse or other user input device to click or hover a mouse/selection pointer over the statistic as it is displayed in table 530, and the corresponding time slot or heat map square representing the minimum or maximum event count for the row may be highlighted or otherwise visually indicated to the user via GUI 500.

By enabling the user to view a visualization of the number of events having various values for a field over time, GUI 500 may enable the user to notice patterns in the occurrence of values for a given field in events. Such a visualization provided via GUI 500 may also allow the user to find potential anomalies or useful patterns (e.g. periodicity) within a field's values, e.g., simply by viewing the visualization presented in visualization window 510. In an example, the user might choose to view the values for a "server status" field, which may include categorical values of server responses (e.g., various HTTP status codes, such as 200, 301, 404, etc.). The visual representation of these values over time may enable the user to determine how the server's statuses relate to each other, and possibly, detect correlations or anomalies. Thus, the capability to visualize a field's values over time may provide the user with a better understanding of the state of the particular server.

In another example, the user might choose a field including values representing the usage percentage of processor or central processing unit (CPU) of a server or other computing device within the enterprise network environment. Such a CPU usage field may be a percentage (e.g., 56, 75, 90, 99, etc.). By visualizing values for the field over time in the events that have that field, the user may easily determine how the CPU usage may change over time and, as before, detect any correlations or anomalies in the field's values. Because the field in this example includes numerical values, the relationship between the field's values can be meaningfully represented using two or more linear axes (e.g., value and time). Examples of such a numerical field include, but are not limited to, a CPU usage field, a network throughput field (e.g., including values representing bytes transferred), or a network latency field (e.g., including response times for requests sent over the network). However, it should be noted that a numerical field may represent any type of data that can be represented by numeric values, including integers or real number values.

In the example shown in FIG. 5A, the data type of each value included within value table 530 is a string. Thus, in contrast with the numerical fields having values of a numeric data type, as described in the prior example above, it might not be possible to meaningfully represent the relationship between values of the specified field in the visualization displayed within GUI 500 using two or more linear or numerical axes. Rather, at least one of the axes (i.e., the rows) may need to be categorical, with each row representing a particular string value for the field, as shown in GUI 500. Examples of categorical fields that may be extracted from indexed event data may include, but are not limited to, server responses, universal resource identifiers (URIs), or the names of an operating system or host associated with a particular data source.

In some implementations, the particular data type of the specified field may affect the particular visualization that may be used to represent the field's values over time. The values of a categorical field may be represented using, for example, a heat map, as shown in FIG. 5A. However, the values of a numerical field may be visualized as, for example, either a heat map or other type of data chart, e.g., a bubble chart as shown in each of FIGS. 10A and 10B, as will be described in further detail below. It may be appreciated that a user may find one type of visualization, e.g., a heat map, to be more advantageous or better suited for analyzing changes in categorical/string values over time (with a different row for each unique string value for the chosen field) relative to other types of data representations or visualizations, e.g., a bubble chart for representing numerical values for a field. In other implementations, the user may be provided an option, e.g., via GUI 500, to switch between different types of visualizations, e.g., between a bubble chart and a heat map, for both categorical and/or numerical fields. Further, it should be noted that the present disclosure is not intended to be limited to heat maps and bubble charts and that any of various other types of visualizations or graphical representations may be used to visualize changes in machine data field values over time. Examples of such other types of visualizations include, but are not limited to, line graphs, bar graphs, pie charts, fractal maps, tree maps, waterfall charts, or stream-graphs including a stacked, linear, or curvilinear area graph displaced around a central axis. Furthermore, such visualizations may be represented in two-dimensional (2-D) and/or three-dimensional (3-D) forms, e.g., using shapes visualized within 2-D and/or 3-D spaces, respectively.

In an example, the user may select a particular time slot or heat map bucket in order to view additional information related to the selected time slot and the particular field value to which it corresponds. The user may be able to select the time slot by interacting directly with a corresponding box or region of the heat map displayed within visualization window 510, e.g., by selecting the region using a mouse, touchpad, keyboard, or any other user input device. The selected time slot may be within a portion 515 of the displayed heat map, as shown in FIG. 5A.

Figure 5B:
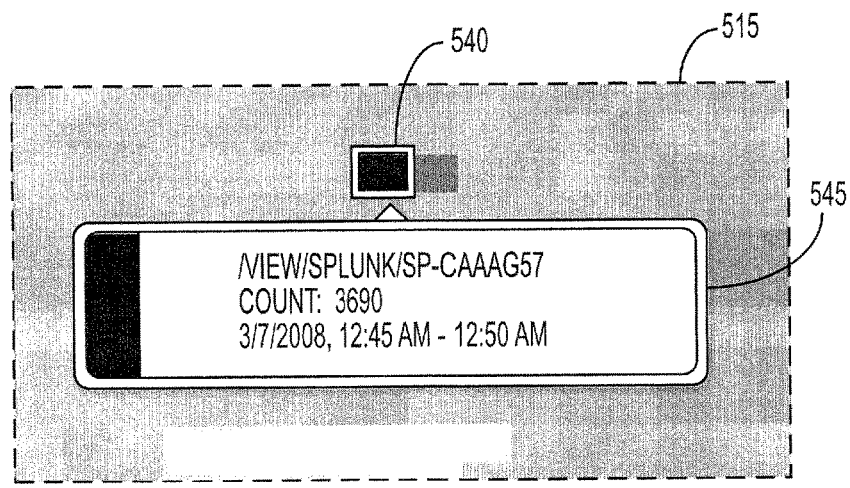
FIG. 5B illustrates an exemplary user control element of the GUI shown in FIG. 5A for displaying additional information related to events having values for the categorical field during a selected time slot allocated within the selected time range.

FIG. 5B shows another view of portion 515 including an exemplary information dialog window 545, e.g., in the form of a dropdown window or other type of user control element, which may be displayed within visualization window 510 of GUI 500 in conjunction with a square region 540 of the heat map corresponding to the selected time slot. As shown in FIG. 5B, dialog window 545 may provide relevant information related to the selected time slot corresponding to heat map square 540. Such information may include, for example and without limitation, the corresponding field value, a count value indicating the number of events associated with the selected time slot, and a time period represented by the time slot.

As noted previously, the user may be able to select multiple heat map boxes, squares, or regions via GUI 500, e.g., by using a mouse or other user input device to "scan" or select and drag a virtual bounding box across or around one or more rows and/or columns of the heat map displayed in visualization window 510. As the user selects additional squares representing different time slots within the heat map, the information displayed within dialog window 545 may update automatically and in real-time as each new heat map square is selected. In this way, the user may be able to select certain heat map squares corresponding to particular values and time slots of interest, while filtering or excluding other values and/or time slots from the visualization being displayed within visualization window 510. In some embodiments, after selecting a plurality of heat map squares within a virtual bounded box, a user may de-select desired squares so that information relating to the de-selected squares is excluded from the information displayed in dialog window 545.

In some implementations, the information displayed within dialog window 545 may include, for example, hyperlinks that the user may select in order to change the view, such as drilling down to a view of the underlying events falling within the selected time slot. In the example shown in FIG. 5B, the value corresponding to the selected heat map box 540 is displayed within window 545 as "NIEW/SPLUNK/SP-CAAAG57." In an exemplary embodiment, this value may be displayed within window 545 as a hyperlink. For example, if the user in this example were to select the hyperlink, GUI 500 may display additional information about all of the events corresponding to heat map box 540. Along those same lines, the count (e.g., as reflected by "COUNT: 3690") and the time range (e.g., as reflected by "3/7/2008, 12:45 AM-12:50 AM") may each be generated as a hyperlink that a user may click or otherwise select to view the events associated with the time slot for which the tooltip containing the hyperlink was generated.

Figure 5C:
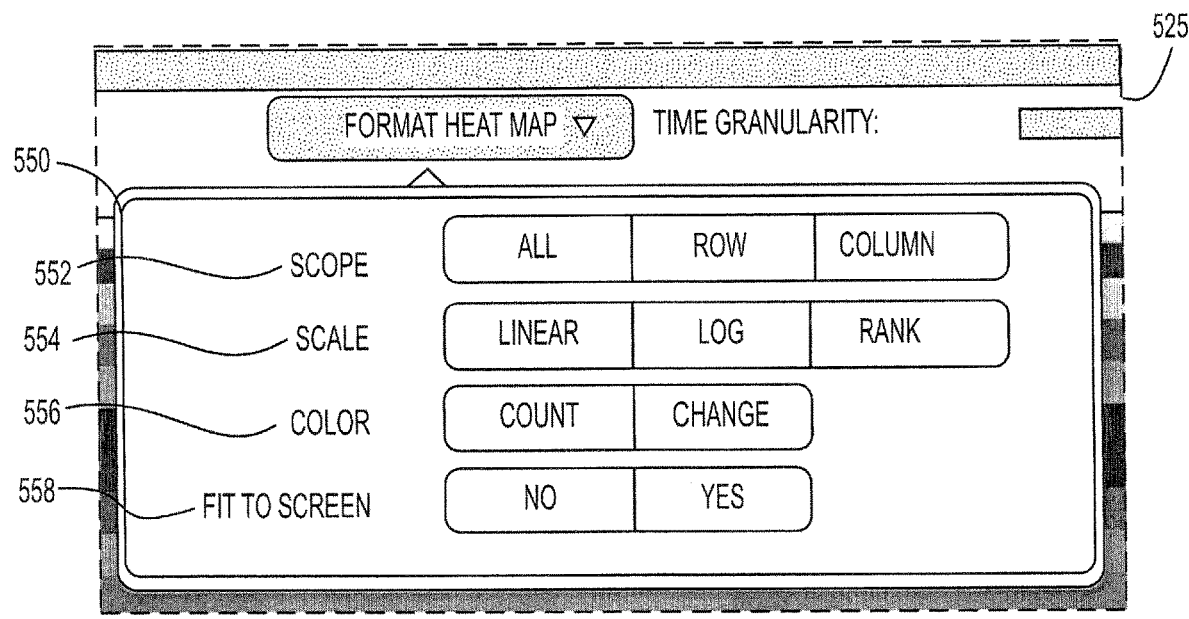
FIG. 5C illustrates an exemplary format control element of the GUI shown in FIG. 5A for providing a user with various formatting options to customize the heat map visualization for the categorical field over the time range.
Figure 6A:
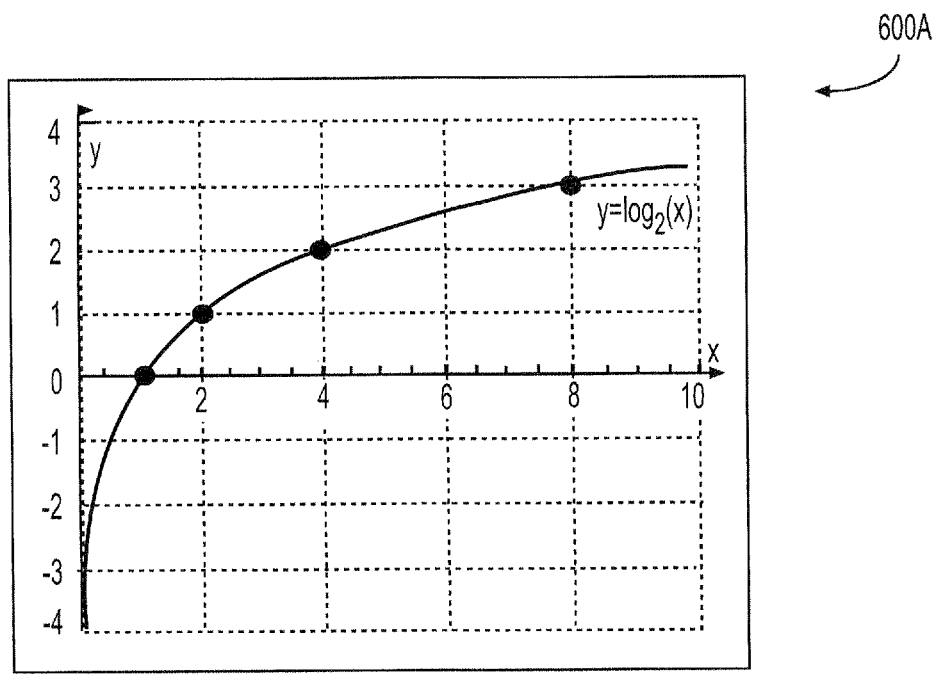
FIG. 6A illustrates an exemplary logarithmic scale of a color gradient that may be used for displaying the heat map visualization via the GUI of FIG. 5A.
Figure 6B:
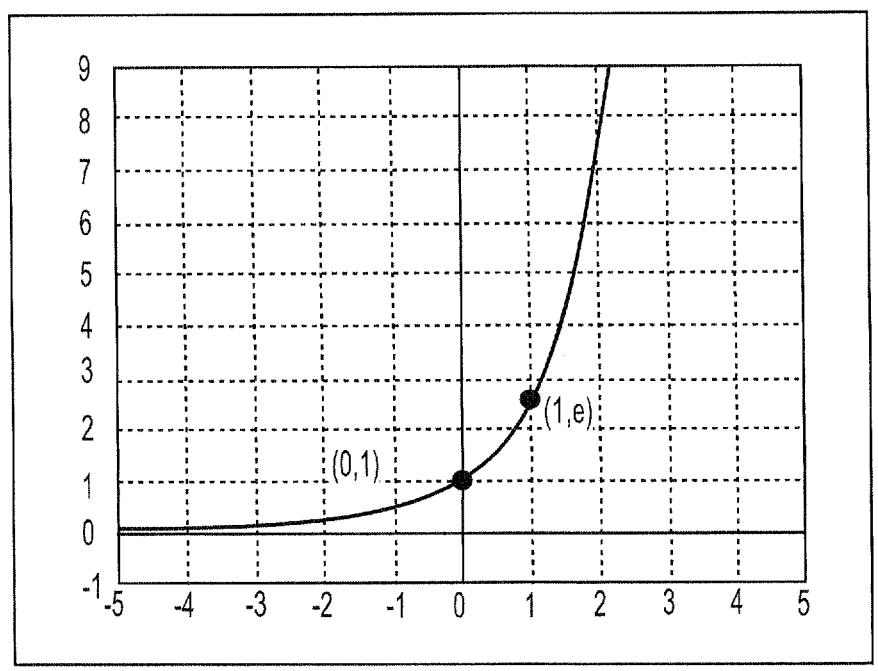
FIG. 6B illustrates an exemplary exponential scale of a color gradient that may be used for displaying the heat map visualization via the GUI of FIG. 5A.
Figure 7:
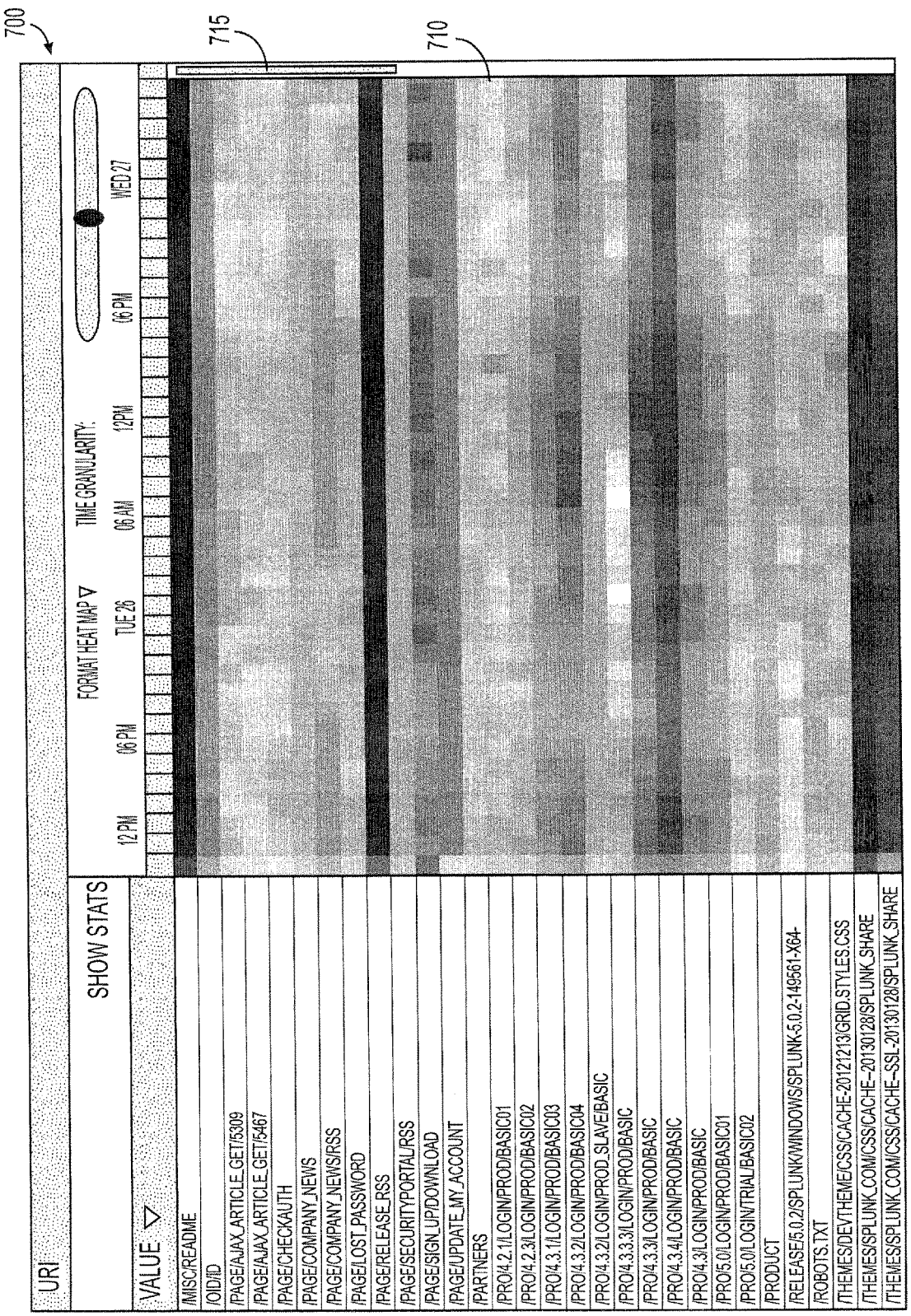
FIG. 7 illustrates another exemplary GUI for displaying a heat map visualization of events having values for a categorical field over a time range.

As shown in FIG. 5C, GUI 500 may also provide the user with a set of formatting controls 550, e.g., within control window 525, which enable the user to selectively customize the heat map visualization displayed within visualization window 510. In some implementations, formatting controls 550 may be displayed as selectable options within a pop-up/dropdown menu, dialog box, or window of GUI 500. For example, such a menu or window may be accessible to the user by using a mouse or other type of user input device to select a corresponding button (e.g., button labeled "Format Heat Map," as shown in FIG. 5C) or other type of control displayed within GUI 500. Also, as shown in the example of FIG. 5C, formatting controls 550 include a scope control 552, a scale control 554, a color control 556, and a fit-to-screen control 558. However, it should be noted that the formatting controls provided to the user are not intended to be limited thereto. In an example, the particular formatting controls 550 provided to the user may be dependent upon, for example, the particular events and user requirements for the types of control that the user may need for visualizing the data effectively within the heat map. Further, the formatting controls 550 provided may be dependent upon on the types of data underlying the heat map visualization. In an example, GUI 500 may be provided to the user via a client application executable at a mobile computing device (e.g., a smartphone or tablet) having a touchscreen display. The user in this example may be able to use any of various single or multi-touch gestures to manipulate different control elements, e.g., any of formatting controls 550, in order to control or customize any of various aspects of the visualization displayed within visualization window 510 and/or the values and statistics displayed within value table 530.

In the example shown in FIG. 5C, scope control 552 may enable the user to change the scope of the color gradient mapping for event counts visualized in the heat map for each of the unique values of the field over time. Scope control 552 may provide various selectable options that enable the user to control the scope of the mapping of the color gradient to the range of event counts from a minimum to a maximum event count with respect to the rows and/or columns of the heat map visualization. As shown in FIG. 5C, such options may include, for example and without limitation: an "ALL" option for selecting the minimum and maximum for a range of event counts to be mapped from counts of all heat map boxes in the entire visualization, i.e., across all rows and columns of the heat map; a "ROW" option for selecting the minimum and maximum for a range of event counts on a row-by-row basis; and a "COLUMN" option for selecting the minimum and maximum for a range of event counts on a column-by-column basis.

Also, as shown in FIG. 5C, scale control 554 may be used to change the scale of the color gradient according to various scale options including, for example, a linear scale, a logarithmic scale, and a rank. The linear scale option may be selected to change the color gradient along a linear scale based on the event count for one or more values across a row or column. In this example, the gradient of the color or shade applied to rows or columns of the heat map may change uniformly along a linear scale from a minimum event count (or corresponding heat map box) to a maximum event count (or corresponding heat map box). It should be appreciated that the scale of the color or shading gradient also may be adjusted depending on the type of scope that was selected, as described above. For example, the minimum and maximum counts used for a graduated color or shading transition may change depending on whether the values are based on a single row, a single column, or all of the rows and columns in the visualization. Thus, the selection of the linear scale option may cause the color or shade to be applied to regions of the heat map (e.g., heat map boxes along a row or column) in an even, graduated transition (e.g., from lighter to darker) in constant increments from a minimum (e.g., a heat map box representing a minimum event count) to a maximum (e.g., a heat map box representing a maximum event count). In other words, each incremental increase in the count or change in the number of events between successive heat map boxes in a row or column may result in a proportional increase in color or shading, regardless of whether the count or change is closer to a minimum count/change or a maximum count/change. For example, the visualization according to a linear scale may cause the density or intensity of the color or shade applied to a heat map box representing an event count of 100 (or "a 100-count bucket") to be twice as much as the density or intensity of the color or shade used for a 50-count bucket.

As another embodiment, a logarithmic scale option may be selected in order to change the applied color gradient according to a logarithmic scale based on the event count for one or more values across a row or column. In this example, the gradient of the color or shade applied to rows or columns of the heat map may change gradually along a logarithmic scale from a minimum event count (or corresponding heat map box) to a maximum event count (or corresponding heat map box), in which the color or shade is applied to successive heat map boxes from a minimum event count to a maximum event count in a graduated transition using increasingly greater increments of color or shade. In this embodiment, the change in color or shade depicted by such a logarithmic scale may be used to indicate a greater degree of difference between adjacent heat map boxes representing relatively lower event counts that are closer to the minimum within the range of event counts. For example, the visualization according to a logarithmic scale may indicate a relatively greater degree of difference between the colors or shades applied to a 50-count bucket and a 60-count bucket than the difference indicated between the shades of a 150-count bucket and a 160-count bucket. An example of such a logarithmic scale is shown by line graph 600A in FIG. 6A.

The rank option may be used to assign a color gradient or level of shading to each heat map square or time slot in a linear fashion based on the rank of the particular event count. For example, for the following set of event counts {1, 76, 77, 78}, each count or numerical value within the set may be ranked, e.g., from the lowest count to the highest. Thus, the count "1" may be ranked first or lowest, "76" may be second, "77" may be third, and "78" may be fourth or highest. The heat map square corresponding to each of the event counts in this example data set may be colored according to its assigned rank. In an example, the color or shading of the heat map square having the lowest ranked count (e.g., "1") may be only 25% of the full color or shading, the second lowest ("76") may have 50% color, the third lowest may have 75% color, and the highest ranked square ("78") may have 100% of the full color. However, it should be noted that any type of ranking scheme may be used to rank the event counts. Thus, in the preceding example, the ranking order may be reversed, and the count "78" may be ranked first or lowest, "77" may be second, "76" may be third, and "1" may be fourth or highest ranked count. The rank option may be useful for differentiating tightly packed data sets having counts that are relatively close in value to one another.

While not shown in FIG. 5C, another scale control option that may be provided to the user may be, for example, an exponential scale for the color gradient. Such an exponential scale option may be selected in order to change the applied color gradient according to an exponential scale based on the event count for one or more values across a row or column. In this example, the gradient of the color or shade applied to rows or columns of the heat map may change gradually along an exponential scale from a minimum event count (or corresponding heat map box) to a maximum event count (or corresponding heat map box), in which the color or shade is applied to successive heat map boxes from a minimum event count to a maximum event count in a graduated transition using increasingly lower increments of color or shade. In this embodiment, the change in color or shade depicted by such an exponential scale may be used to indicate a greater degree of difference between adjacent heat map boxes that represent relatively higher event counts and that are located closer to the maximum within the range of event counts. In this example, the difference indicated by the visualization between the shade applied to a 150-count bucket and the shade applied to a 160-count bucket may be relatively greater than the difference indicated between the respective shades applied to a 50-count bucket and a 60-count bucket. An example of such an exponential scale is shown by line graph 600B in FIG. 6B.

Referring back to formatting controls 550 of FIG. 5C, color control 556 may be used to change the measure used for the color gradient. Color control 556 may provide a count option that causes the color gradient and color of each heat map square to be determined according to is event count, e.g., a count value representing the number of events corresponding to each heat map square. Color control 556 may also provide a change option, which causes the color gradient and color of each heat map square to be determined based on a difference between its event count and the event count of an adjacently located heat map square.

Screen control 558 may be used to enable or disable a "Fit to Screen" option that affects the display of values within value table 530 and the heat map within visualization window 510. For example, when this option is disabled (e.g., set to "NO" via control 558), value table 530 is displayed such that each heat map row has a predetermined height and each heat map column has a predetermined width, and the predetermined height and width may be set to ensure that, among other things, the values displayed within table 530 are legible for the user. An example of a heat map visualization with this option selected is illustrated by a GUI 700 in FIG. 7. As this option may limit the number of values and rows that can be displayed at the same time where fit-to-screen is flagged as "NO," a scroll bar control 715 may be provided to enable the user to scroll vertically in order to view any heat map rows that may not be visible in the current view displayed via GUI 700. However, it should be noted that screen control 558 is not necessarily limited to vertical scrolling and that when the fit-to-screen option is disabled using control 558; as described above, additional controls (not shown) for enabling the user to scroll side-to-side may be provided as well, thereby allowing the user to modify the visible time range displayed within visualization window 510.

Figure 8:
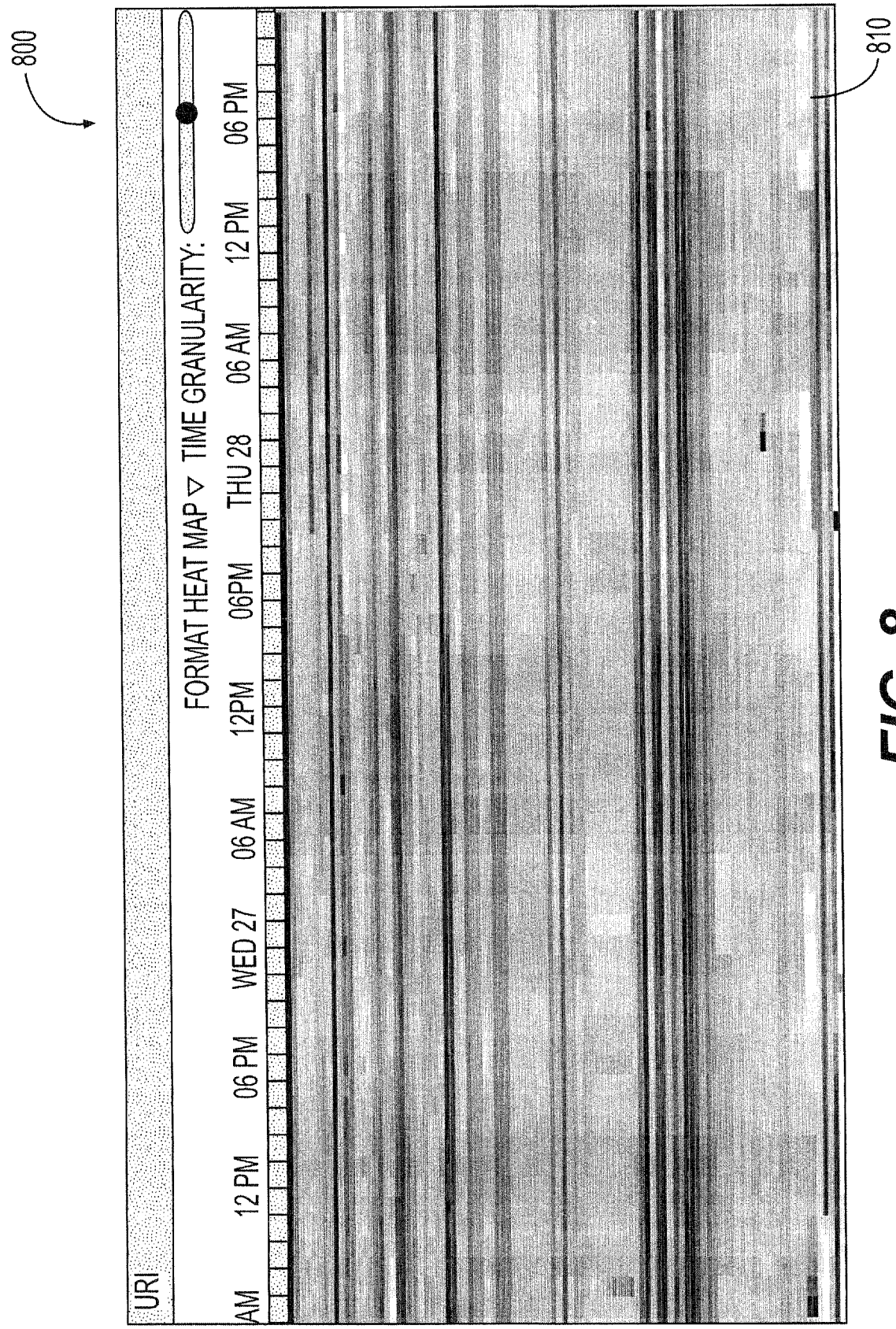
FIG. 8 illustrates another view of the exemplary GUI of FIG. 7 for displaying a visualization of all values for the categorical field over the time range.

When the fit-to-screen option is enabled (e.g., set to "YES" via screen control 558), value table 530 may be hidden and all rows and columns of the heat map are displayed within the visible viewing area of the GUI, as shown by the exemplary GUI 800 of FIG. 8. The height of the heat map rows and the width of the heat map columns may be adjusted to be sure the entire heat map fits on the viewable area of the screen. As all rows and columns are displayed in this view, a scrollbar control, e.g., for vertical scrolling or side-to-side scrolling, may not be necessary.

In some implementations, additional controls may be provided for changing the color gradient of the heat map across a spectrum from a light color or shade to a dark color or shade, according to the corresponding event counts of the heat map squares or associated time slots. In an example, a "High" option for such a control may cause the gradient to be adjusted from a light color or shade at low event counts to progressively darker color/shade for relatively higher event counts. Conversely, the control may include a "Low" option for adjusting the gradient from a dark color at low values to progressively lighter colors or shades for relatively higher event counts.

While the exemplary GUIs described above with respect to FIGS. 5A-9C relate to visualizing discrete values for a field over time, the GUI provided to the user also may be used to visualize values for a numerical field over time by plotting them against a vertical number axis (as well as a horizontal time axis) rather than assigning each unique value for the field of interest to an individual row, as will be described below with respect to FIGS. 10A and 10B. It should be noted that the techniques disclosed herein with respect to the examples provided below with respect to FIGS. 10A and 10B also may be applied to the exemplary GUIs described above with respect to FIGS. 5A-9C. Further, while not shown in the exemplary GUIs described herein, it should be noted that any number of additional controls may be provided to the user for controlling or customizing the visualization of a field's values provided to the user. In an example, such additional controls may include a control enabling the user to switch or adjust a "base" or default color used for the heat map visualization, e.g., from one primary color to another (e.g., blue to red) or across a palette of different colors that may be supported in a particular implementation. In a further example, the user may be able to specify different colors for visualizing different values (and rows). In some implementations, the user may be able to designate a particular color to be used for a category of values, for example, as may be defined based on one or more predetermined or user-specified thresholds for arranging field values according to different time periods (e.g., including one or more time slots) within the time range and/or different ranges of event counts.

Figure 10A:
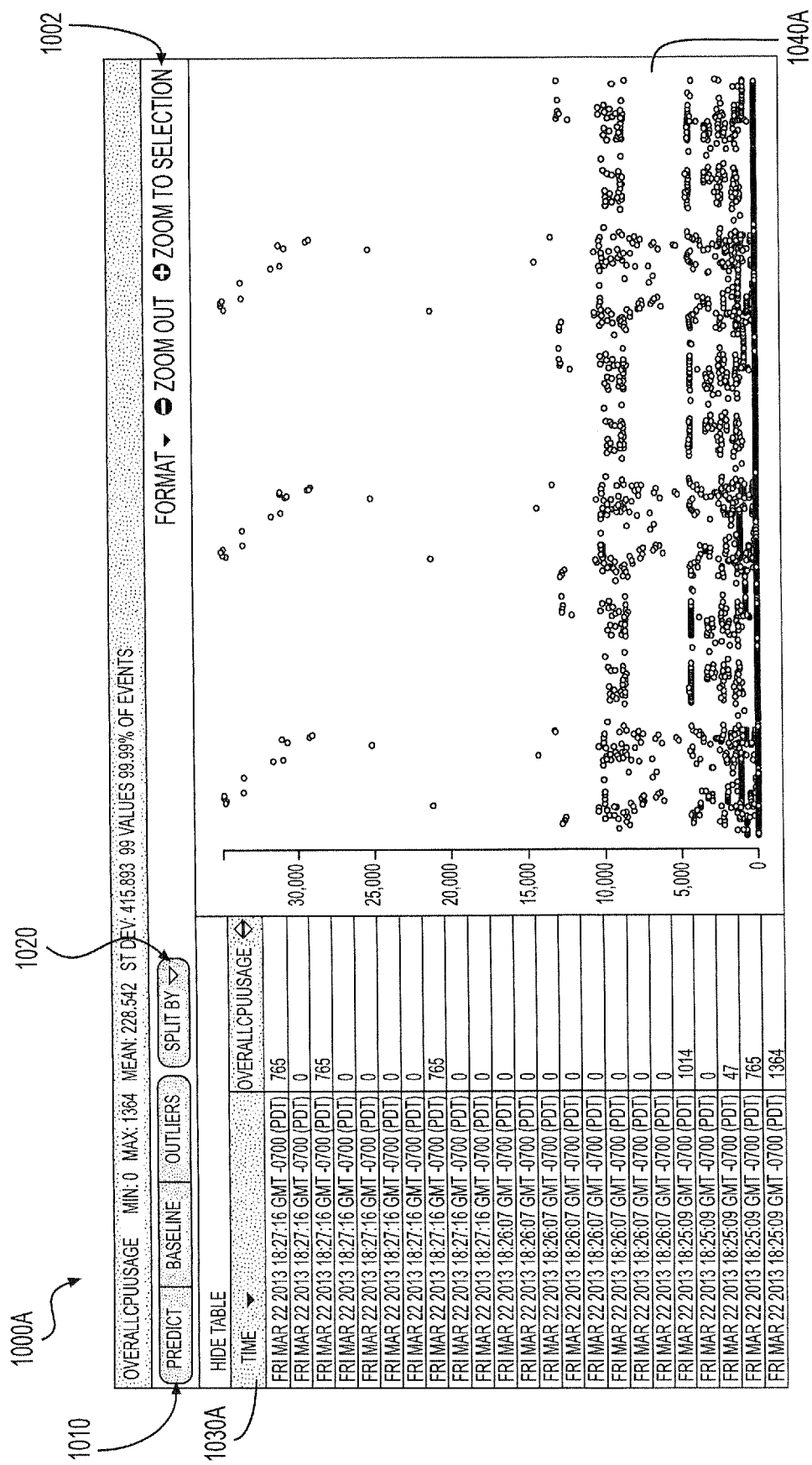
FIG. 10A illustrates an exemplary GUI for displaying a visualization of values for a numerical field over a time range.

FIG. 10A illustrates an exemplary view 1000A of a GUI (hereinafter referred to as "GUI 1000A") for displaying a visualization of values for a specified numerical field over a selected time range. GUI 1000A may include one or more of the features of the other GUIs described herein. As shown in FIG. 10A, GUI 1000A includes a visualization window 1040A and a value table 1030A. Window 1040A may be used for displaying a visualization of the numerical field's values over the time range, or at least a visible portion thereof. Also, as shown in FIG. 10A, a set of zoom controls 1002 may be provided for enabling the user to increase or decrease a level of zoom at which the visualization is displayed within window 1040A. Furthermore, an event summary 1004 including statistical information also may be provided in a portion of GUI 1000A.

Value table 1030A may include rows of the extracted values of the specified field. The values in table 1030A may correspond to the same event data that is graphed using the bubble chart. However, table 1030A may include any suitable values or statistics, as desired for a particular implementation. In one example, value table 1030A may include the date and the field value. In some implementations, an option to hide value table 1030A may be provided in order to increase the size of the visualization as it is displayed in visualization window 1040A of GUI 1000A. When a user selects a bubble corresponding to an event, the event may be identified in the visualization.

Figure 10B:
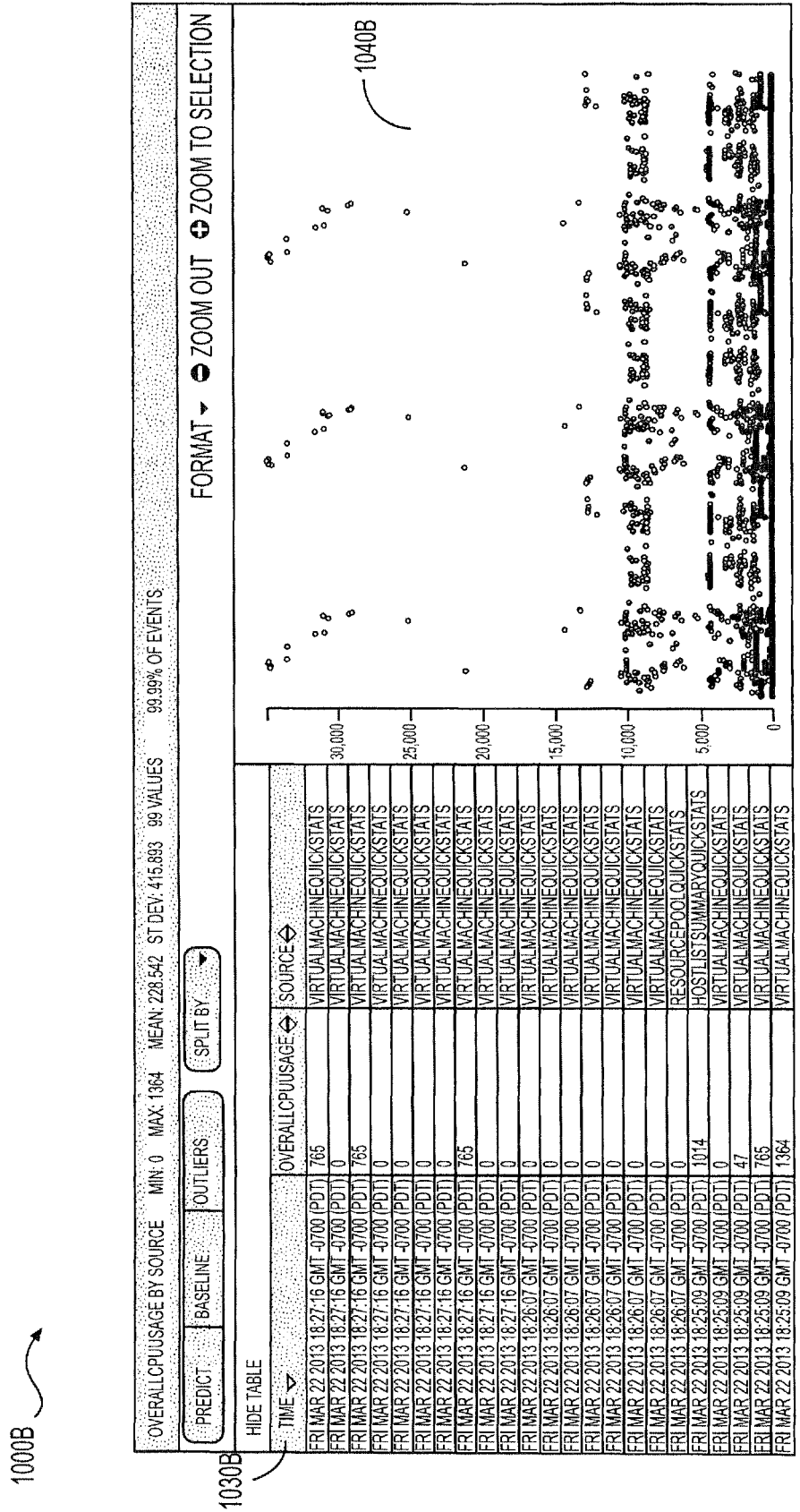
FIG. 10B illustrates another view of the exemplary GUI of FIG. 10A for displaying a visualization of the numerical field's values over the time range, where the displayed values are separated according to values for another selected field.

While the exemplary visualization shown in FIGS. 10A and 10B are bubble charts, it should be noted that any type of visualization may be used to visualize numeric values of a specified numerical field. In an example, each event may be represented by a bubble in the visualized bubble chart. As each bubble in the chart may be displayed using the same or a default level of opacity, it may become difficult for the user to distinguish between overlapping points or bubbles that occur around the same time within the chart and that represent values that are the same or close to each other. This may be true even when, for example, the disparity between different event counts is relatively high (e.g., 1 and 200). Thus, in some embodiments, the overlapping bubbles occurring around the same time, e.g., within a predetermined time period, may be shown using varying levels of opacity in order to make these overlapping points or bubbles easier to distinguish from one another within the chart. For example, an area having a relatively greater number of overlapping points or events, e.g., above a predetermined threshold, may be displayed using a darker shade. Thus, in some embodiments, the density measure for different event counts may be visualized such that when an opacity of overlapping points surpasses a predetermined threshold or maximum shade, the color or shading may be changed to a distinctly unique color or shade designated to represent relatively higher density event counts. For example, a different color and/or shading (e.g., a light red color instead of a darker red or blue) may be used to visualize relatively lower or higher density event counts. In some embodiments, multiple overlapping points or bubbles, e.g., above a predetermined threshold, within an area of the bubble chart (e.g., corresponding to the same predetermined time period) may be combined into a single bubble of a relatively larger size, thereby providing a relatively easier way to visually distinguish a plurality of event counts occurring around the same time.

In some implementations, the different colors or shading applied to various event count densities may be represented using, for example, a graphical overlay visualized with respect to the bubble chart (or one or more bubbles thereof), as displayed within visualization windows 1040A or 1040B of FIG. 10A or 10B, respectively. In some implementations, the relative size and/or shape of each bubble displayed within the bubble chart may be adjusted according to its event count density. For example, the size of a bubble having a relatively higher event count density, and thus, representing a relatively greater number of event counts, may be relatively larger than a bubble having a relatively lower event count density and representing a relatively smaller number of event counts. In a further example, a predetermined minimum event count threshold, e.g., as configured by the user, may be used to define the minimum number of event counts required for a bubble (or its corresponding event data point) to be visualized. While the examples provided above are described in the context of different implementations for the bubble chart displayed in visualization windows 1040A or 1040B of FIG. 10A or 10B, respectively, it should be noted that the disclosed techniques may be applied to other types of visualizations, including to the different boxes or square regions of the heat map visualization, described above with respect to FIGS. 5A-9C.

FIG. 10B illustrates another view 1000B of the exemplary GUI of FIG. 10A (hereinafter referred to as "GUI 1000B") for displaying a visualization of the selected numerical field's values over the selected time range. Unlike GUI 1000A shown in FIG. 10A, the values displayed in GUI 1000B of FIG. 10B may be separated according to values for another field, e.g., as specified by a user via a "split-by" control 1020 of GUI 1000A (and GUI 1000B). By invoking control 1020, the user may be able to split or break up the bubble chart into separate categories based on another specified field (e.g., a source type field). For example, splitting CPU usage by source type may cause the color of the bubbles in the chart to change based on the particular source type with which each bubble and corresponding event is associated.

In some implementations, the user's selection of a field value within the table or the visualization may cause a new GUI window to appear, which displays information related to only the selected field value. FIGS. 11A-11D illustrate an exemplary GUI that may be displayed for this purpose. For example, if the field was URI and the user clicked the value "/download," a GUI 1100A may be displayed, in which only data related to the "/download" value is visualized, such as a count of events at different times that have the selected value for the field.

Figure 11A:
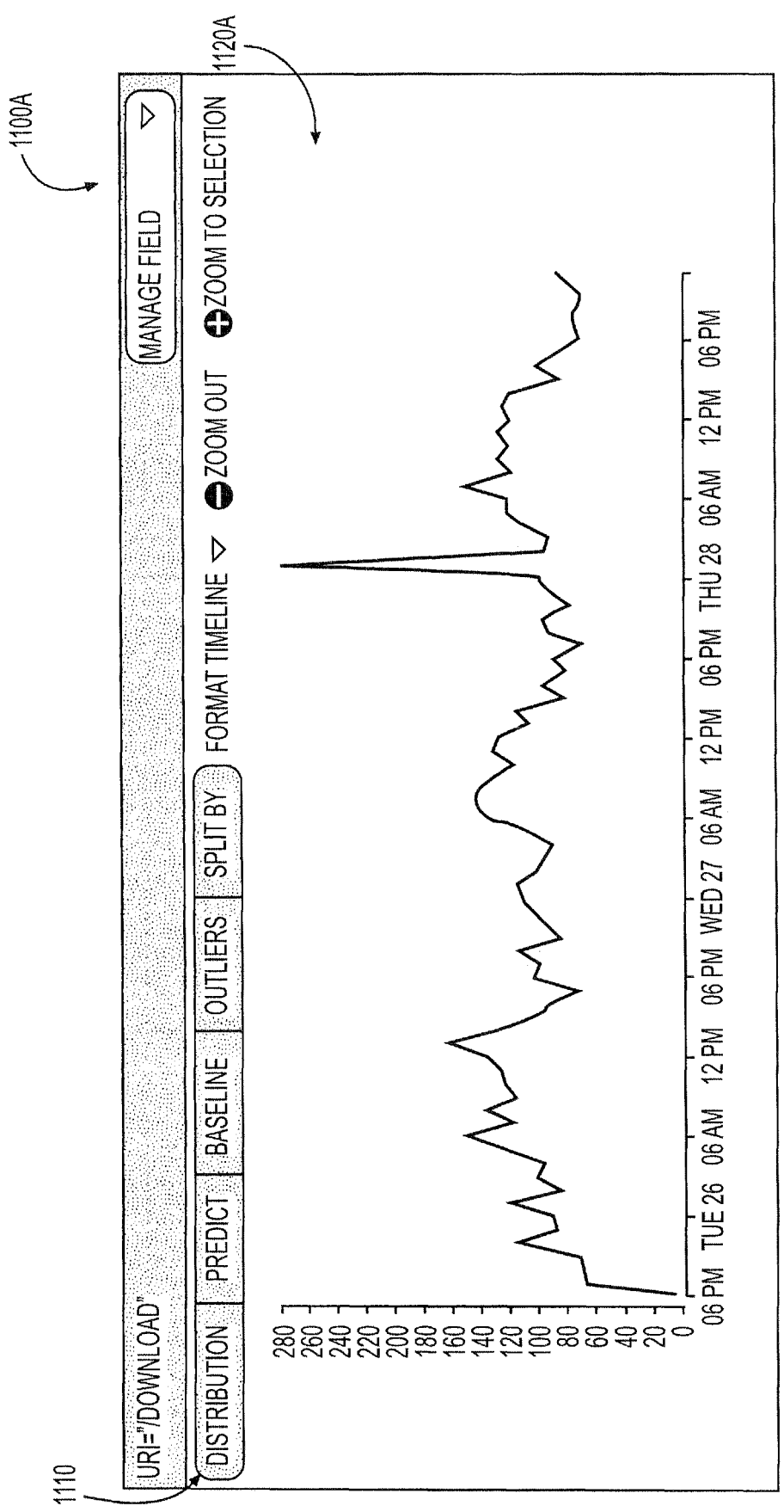
FIGS. 11A-11D illustrate different views of an exemplary GUI for displaying a visualization of values of a field over a time range.
Figure 11B:
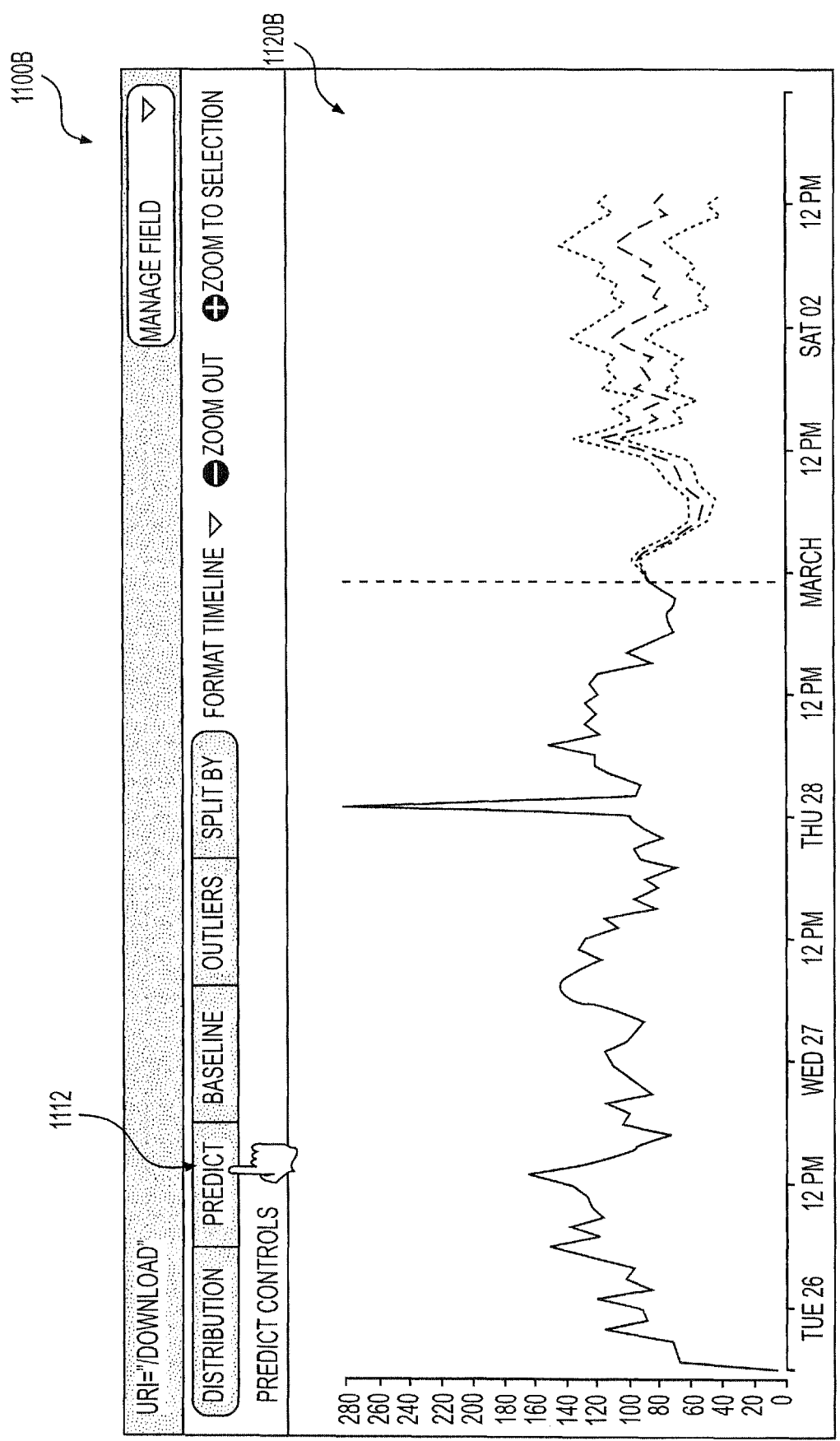
Figure 11C:
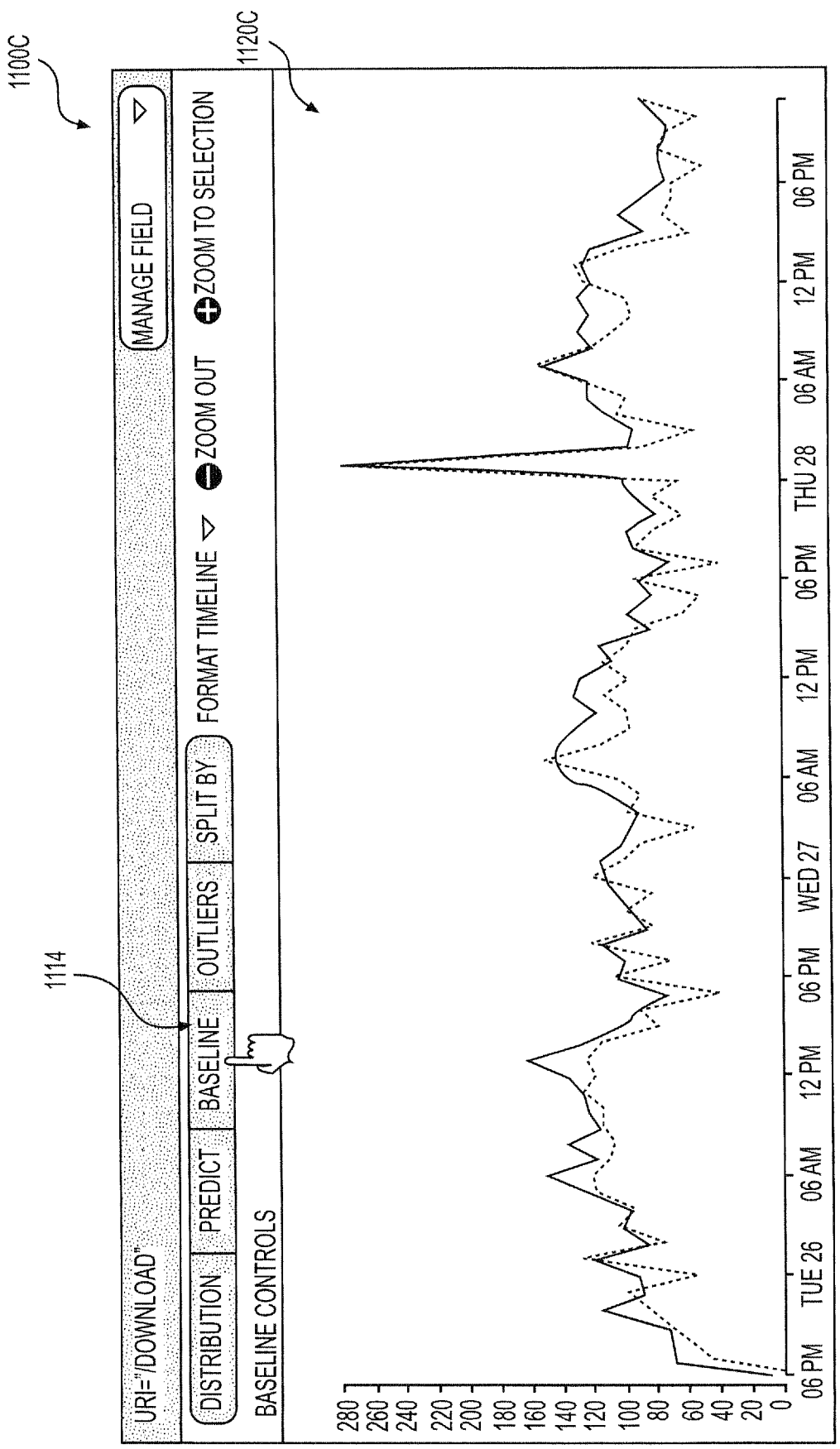
Figure 11D:
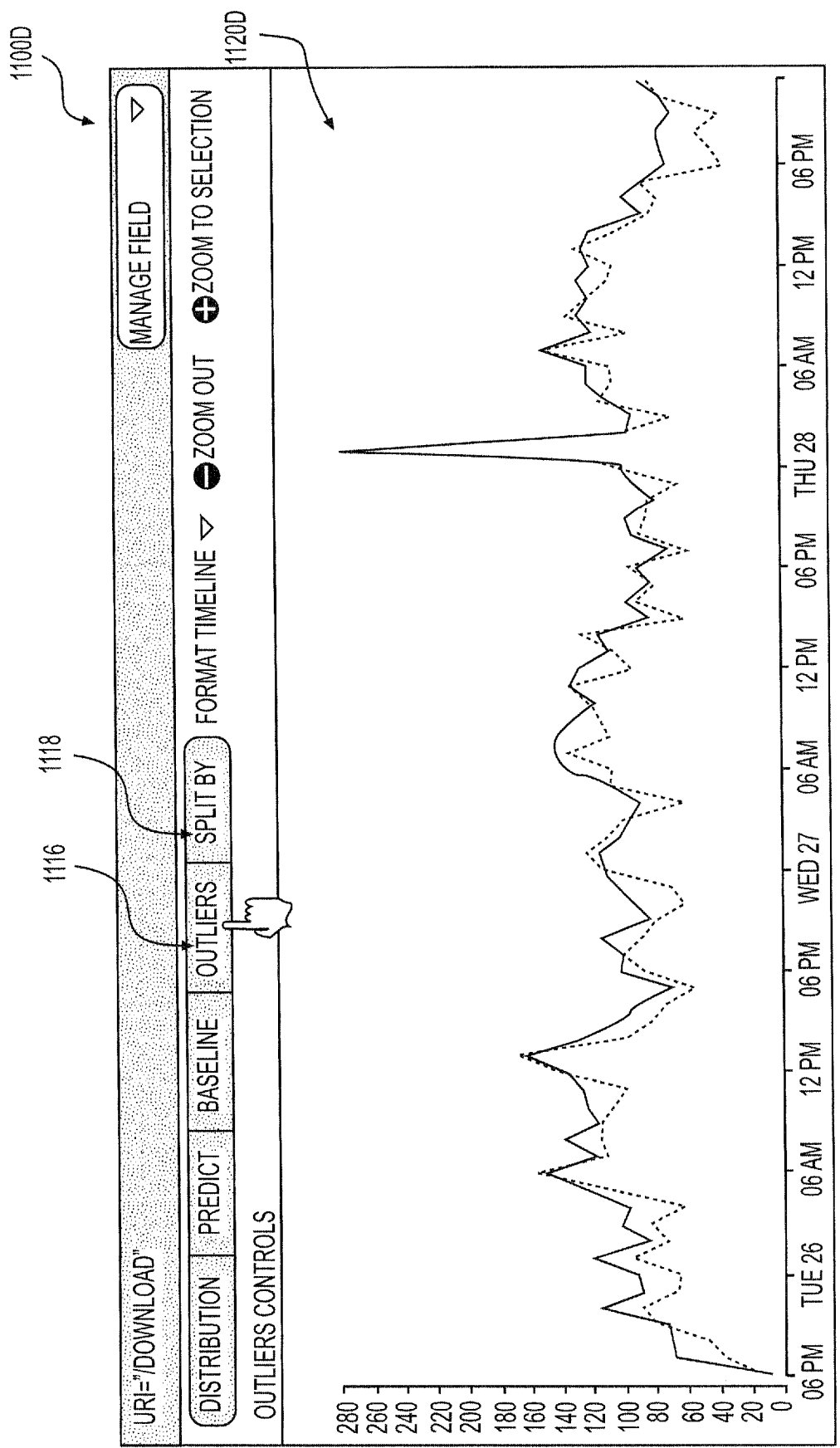

Further, the user may be presented with a set of controls including, for example and without limitation, controls 1110, 1112, 1114, and 1116, as shown in FIGS. 11A-11D, respectively, for invoking different data analysis functions with respect to the selected field value. A distribution control 1110 may be used to plot the number of events having a given value for a field over a selected time range, as shown in FIG. 11A. The visualization shown in FIG. 11B may be displayed by selecting a prediction control 1112 for predicting what the plot of the number of events having the specified value for the field would look like for future time periods based on extrapolating from the actual number of events for time periods for which this is known. In FIG. 11C, a baseline control 1114 may be selected for visualizing a comparison plot of the actual number of events having a specified value for the selected field against what would have been expected by extrapolating out what this plot would have been expected to look like from earlier time periods. In FIG. 11D, an outlier control 1116 may be used to invoke data analysis features for finding any potential outliers in the data over time. Also, as shown in FIG. 11D, a split-by control 1118 may also be provided, which may allow the user to split or categorize portions of the value's data according to another specified field, much like the split-by control of GUI 1000, as shown in FIGS. 10A and 10B and described above.

Further, any number of additional controls may be provided to the user via each of GUIs 1100A, 1100B, 1100C, and 1100D of FIGS. 11A, 11B, 11C, and 11D, respectively. Such additional controls may include, for example and without limitation, a control enabling the user to invoke a sort function. Similar to the sort function described above with respect to FIGS. 9A and 9B, the sort function in this example may allow the user to sort the event data points plotted along the line graph in a desired order, e.g., in either an ascending or descending order based on the corresponding event counts. The sortable event counts in this example may correspond to, for example, the numbers shown along the y-axis of the visualized charts and line graphs shown in each of FIGS. 11A-11D. Thus, for example, the event counts displayed along the y-axis may be sorted automatically based on input received from the user, and the plotted data and corresponding line graph may also be updated accordingly.

The examples described above with respect to FIGS. 1-11D, or any part(s) or function(s) thereof, may be implemented using hardware, software modules, firmware, tangible computer readable media having instructions stored thereon, or a combination thereof and may be implemented in one or more computer systems or other processing systems.

Figure 12:
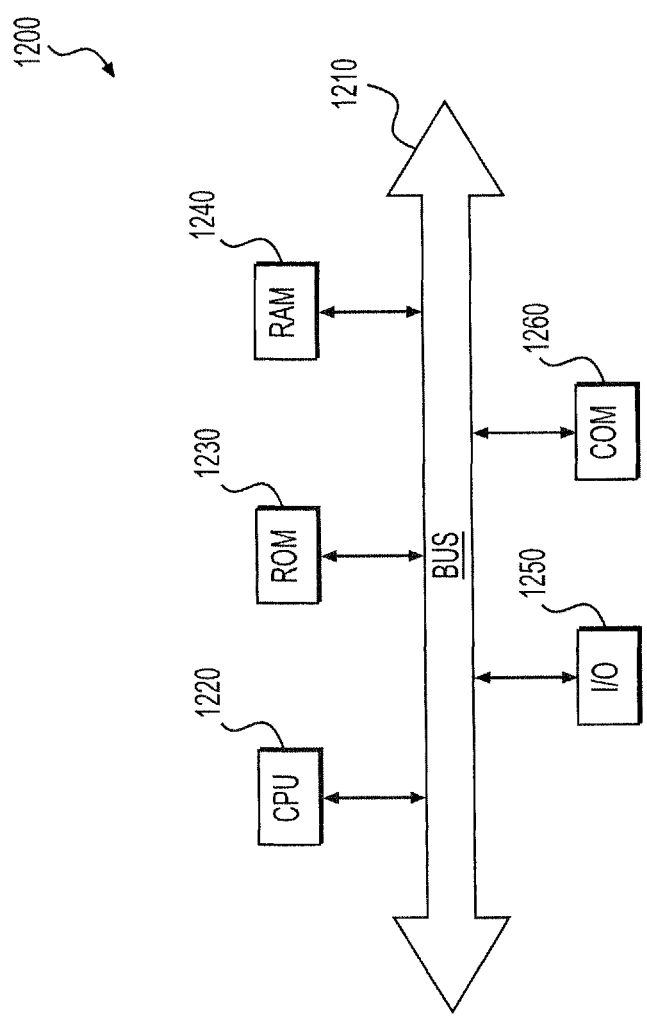

FIG. 12 illustrates a high-level functional block diagram of an exemplary computer system 1200, in which embodiments of the present disclosure, or portions thereof, may be implemented, e.g., as computer-readable code. For example, visualization system 150 of FIG. 1 and data intake and query system of FIGS. 1 and 2 can be implemented in computer system 1200 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-2.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the present disclosure, as described above in the examples of FIGS. 1-11D may be implemented using computer system 1200. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

As shown in FIG. 12, computer system 1200 includes a central processing unit (CPU) 1220. CPU 1220 may be any type of processor device including, for example, any type of special purpose or a general purpose microprocessor device. As will be appreciated by persons skilled in the relevant art, CPU 1220 also may be a single processor in a multi-core/multiprocessor system, such system operating alone, or in a cluster of computing devices operating in a cluster or server farm. CPU 1220 is connected to a data communication infrastructure 1210, for example, a bus, message queue, network, or multi-core message-passing scheme.

Computer system 1200 also includes a main memory 1240, for example, random access memory (RAM), and may also include a secondary memory 1230. Secondary memory 1230, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 1230 may include other similar means for allowing computer programs or other instructions to be loaded into computer system 1200. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 1200.

Computer system 1200 may also include a communications interface ("COM") 1260. Communications interface 1260 allows software and data to be transferred between computer system 1200 and external devices. Communications interface 1260 may include a modem, a network interface (such as an Ethernet card), a communications port, a PCMCIA slot and card, or the like. Software and data transferred via communications interface 1260 may be in the form of signals, which may be electronic, electromagnetic, optical, or other signals capable of being received by communications interface 1260. These signals may be provided to communications interface 1260 via a communications path of computer system 1200, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Computer system 1200 also may include input and output ports 1250 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, this disclosure is not to be considered as limited by the foregoing description.

The breadth and scope of the present disclosure should not be limited by any of the above-described exemplary embodiments, but should be defined only in accordance with the following claims and their equivalents.

Having thus described the invention, what is claimed is:
1. A computer-implemented method comprising:
  causing display of a graphical user interface, the graphical user interface including a first element enabling input to specify a time range and a second element enabling input to specify a field;
  upon receiving first input specifying the time range and second input specifying the field, identifying a plurality of events, wherein each event of the plurality events is associated with respective a timestamp that is within the time range;
  determining, using values for the field included in the plurality of events, unique values;
  causing display, in the graphical user interface, of a visualization of the unique values, the visualization including a first set of rows for each unique value, wherein each row of the first set of rows is divided into regions each representing a timeslot within the time range, wherein each region in a particular row of the first set of rows graphically illustrates a count of events from the plurality of events that both have an associated timestamp that is within a respective timeslot represented by the region and include a particular unique value associated with the particular row;
  causing display, in the graphical user interface, of a table including a second set of rows that each correspond to the first set of rows, wherein each row of the second set of rows includes a set of statistics determined from events from the plurality of events, and wherein the table and the visualization are concurrently displayed; and
  based on a user input of hovering, scanning, or dragging on a specific area of the visualization, causing presentation of a dialog window that includes a hyperlink that, when selected, causes presentation of additional information related to the specific area of visualization.

2. The method of claim 1, wherein the table includes a set of columns, and wherein each column of the set of columns corresponds with a particular type of statistic.

3. The method of claim 1, wherein based on a user selection of a set of regions presented in the visualization, causing presentation of a dialog window that provides information related to the set of regions.

4. The method of claim 1, wherein the regions are vertically aligned by a corresponding timeslot.

5. The method of claim 1, wherein each event of the plurality of events includes a portion of raw data from which the event was derived, the raw data related to security or performance of one or more information technology systems.

6. The method of claim 1 further comprising causing display, in the graphical user interface, of a set of formatting controls that enable user selection of at least one format to apply to the visualization, wherein the at least one format comprises a color format for indicating colors applied to the regions in the visualization.

7. The method of claim 1 further comprising causing display, in the graphical user interface, of a set of formatting controls that enable user selection of at least one format to apply to the visualization, wherein the set of formatting controls displayed are selected based on a type of data associated with the visualization.

8. The method of claim 1 further comprising causing display, in the graphical user interface, of a set of formatting controls that enable user selection of at least one format to apply to the visualization, wherein at least one formatting control comprises a scope control enabling control of a scope of a color gradient mapping for the plurality of events indicated in the visualization.

9. The method of claim 1 further comprising causing display, in the graphical user interface, of a scale control enabling user selection of a color gradient based on a linear scale, a logarithmic scale, a rank, or an exponential scale.

10. The method of claim 1, further comprising sorting the first set of rows, wherein each row is sorted in ascending or descending order based on a number of events corresponding to an intersection of that row with a selected time period.

11. The method of claim 1, further comprising reordering the first set of rows based on a drag and drop gesture received from a user input device.

12. The method of claim 1, wherein each region in the particular row of the first set of rows graphically illustrates the count of events via a color or a color gradient.

13. A non-transitory computer readable storage medium, storing instructions that, when executed by one or more processors, cause performance of:
   causing display of a graphical user interface, the graphical user interface including a first element enabling input to specify a time range and a second element enabling input to specify a field;
   upon receiving first input specifying the time range and second input specifying the field, identifying a plurality of events, wherein each event of the plurality events is associated with respective a timestamp that is within the time range;
   determining, using values for the field included in the plurality of events, unique values;
   causing display, in the graphical user interface, of a visualization of the unique values, the visualization including a first set of rows for each unique value, wherein each row of the first set of rows is divided into regions each representing a timeslot within the time range, wherein each region in a particular row of the first set of rows graphically illustrates a count of events from the plurality of events that both have an associated timestamp that is within a respective timeslot represented by the region and include a particular unique value associated with the particular row;
   causing display, in the graphical user interface, of a table including a second set of rows that each correspond to the first set of rows, wherein each row of the second set of rows includes a set of statistics determined from events from the plurality of events, and wherein the table and the visualization are concurrently displayed; and
   based on a user input of hovering, scanning, or dragging on a specific area of the visualization, causing presentation of a dialog window that includes a hyperlink that, when selected, causes presentation of additional information related to the specific area of visualization.

14. The non-transitory computer readable storage medium of claim 13, further comprising causing display, in the graphical user interface, of a set of formatting controls that enable user selection of at least one format to apply to the visualization, wherein the at least one format comprises a color format for indicating colors applied to the regions in the visualization.

15. The non-transitory computer readable storage medium of claim 13, further comprising causing display, in the graphical user interface, of a scale control enabling user selection of a color gradient based on a linear scale, a logarithmic scale, a rank, or an exponential scale.

16. The non-transitory computer readable storage medium of claim 13, further comprising sorting the first set of rows, wherein each row is sorted in ascending or descending order based on a number of events corresponding to an intersection of that row with a selected time period.

17. The non-transitory computer readable storage medium of claim 13, wherein each region in the particular row of the first set of rows graphically illustrates the count of events via a color or a color gradient.

18. A system comprising:
   a memory having processor-readable instructions stored therein; and
   a processor configured to access the memory and execute the processor-readable instructions, which when executed by the processor, configures the processor to perform a plurality of functions, including functions to:
   cause display of a graphical user interface, the graphical user interface including a first element enabling input to specify a time range and a second element enabling input to specify a field;
   upon receiving first input specifying the time range and second input specifying the field, identify a plurality of events, wherein each event of the plurality events is associated with respective a timestamp that is within the time range;
   determine, using values for the field included in the plurality of events, unique values;
   cause display, in the graphical user interface, of a visualization of the unique values, the visualization including a first set of rows for each unique value, wherein each row of the first set of rows is divided into regions each representing a timeslot within the time range, wherein each region in a particular row of the first set of rows graphically illustrates a count of events from the plurality of events that both have an associated timestamp that is within a respective timeslot represented by the region and include a particular unique value associated with the particular row;
   cause display, in the graphical user interface, of a table including a second set of rows that each correspond to the first set of rows, wherein each row of the second set of rows includes a set of statistics determined from events from the plurality of events, and wherein the table and the visualization are concurrently displayed; and
   based on a user input of hovering, scanning, or dragging on a specific area of the visualization, cause presentation of a dialog window that includes a hyperlink that, when selected, causes presentation of additional information related to the specific area of visualization.

* * * * *